US012154577B2

(12) United States Patent
Li et al.

(10) Patent No.: US 12,154,577 B2
(45) **Date of Patent: *Nov. 26, 2024**

(54) METHOD FOR ENCODING MULTI-CHANNEL SIGNAL AND ENCODER

(71) Applicant: Huawei Technologies Co., Ltd., Shenzhen (CN)

(72) Inventors: Haiting Li, Beijing (CN); Zexin Liu, Beijing (CN); Xingtao Zhang, Shenzhen (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,028

(22) Filed: Jul. 28, 2023

(65) Prior Publication Data

US 2024/0029746 A1 Jan. 25, 2024

Related U.S. Application Data

(63) Continuation of application No. 17/536,932, filed on Nov. 29, 2021, now Pat. No. 11,756,557, which is a (Continued)

(30) Foreign Application Priority Data

Aug. 10, 2016 (CN) ......................... 201610652507.4

(51) Int. Cl.
*G10L 19/008* (2013.01)
*H04S 3/00* (2006.01)

(52) U.S. Cl.
CPC .............. *G10L 19/008* (2013.01); *H04S 3/00* (2013.01); *H04S 2420/03* (2013.01)

(58) Field of Classification Search
CPC . G06F 16/683; G10L 19/008; H04S 2400/03; H04S 2420/03
(Continued)

(56) References Cited

U.S. PATENT DOCUMENTS 5,742,734 A 4/1998 Dejaco et al.
2006/0036434 A1 * 2/2006 May ...................... H04L 1/0003 704/229
(Continued)

FOREIGN PATENT DOCUMENTS

AU 2011357816 B2 6/2016
CN 101601217 A 12/2009
(Continued)

OTHER PUBLICATIONS

Christof Faller, Parametric coding of spatial audio, Ecole Polytechnique Federale de Lausanne(EPFL), 2004, 180 pages.
(Continued)

*Primary Examiner* — Alexander Krzystan
(74) *Attorney, Agent, or Firm* — Conley Rose, P.C.

(57) ABSTRACT

A method for encoding an audio signal includes obtaining an ITD value of a current frame of an audio signal; obtaining a characteristic parameter of the current frame, wherein the characteristic parameter comprises at least one of a signal-to-noise ratio of the current frame or a peak feature of cross-correlation coefficients of the current frame; determining, based on the characteristic parameter, whether to use the initial ITD value as the finalized ITD value of the current frame; and encoding the current frame based on the finalized ITD value of the current frame, wherein if the initial ITD value is determined as not used as the finalized ITD value of the current frame, the finalized ITD value of the current frame is the same as a finalized ITD value of a previous frame of the current frame.

20 Claims, 5 Drawing Sheets

Related U.S. Application Data continuation of application No. 16/818,612, filed on Mar. 13, 2020, now Pat. No. 11,217,257, which is a continuation of application No. 16/272,394, filed on Feb. 11, 2019, now Pat. No. 10,643,625, which is a continuation of application No. PCT/CN2017/074425, filed on Feb. 22, 2017.

(58) Field of Classification Search
USPC .................................. 700/94; 381/23, 20, 21
See application file for complete search history.

(56) References Cited

U.S. PATENT DOCUMENTS

2006/0147048 A1 7/2006 Breebaart et al.
2006/0206323 A1* 9/2006 Breebaart ................. H04S 3/00 704/230
2008/0165874 A1* 7/2008 Steele ................. H04L 27/3863 375/261
2008/0260048 A1* 10/2008 Oomen ................. G10L 21/038 375/241
2009/0119098 A1 5/2009 Zhan et al.
2009/0119111 A1* 5/2009 Goto ..................... G10L 19/008 704/E19.023
2010/0290629 A1 11/2010 Morii
2011/0188583 A1* 8/2011 Toraichi .................... G06T 5/70 375/E7.193
2011/0202354 A1 8/2011 Grill et al.
2012/0265543 A1 10/2012 Lang et al.
2012/0308017 A1 12/2012 Lang et al.
2013/0304481 A1* 11/2013 Briand .................. G10L 19/008 704/500
2014/0098963 A1 4/2014 Lang et al.
2014/0337039 A1 11/2014 Guan et al.
2015/0049872 A1 2/2015 Virette et al.
2015/0340046 A1 11/2015 Chen et al.
2016/0035357 A1* 2/2016 Vasilache ................ H04S 3/008 381/23
2016/0198279 A1 7/2016 Briand et al.
2018/0193642 A1* 7/2018 Chen .................... H04R 25/552
2018/0268826 A1* 9/2018 Vaillancourt ......... G10L 19/032
2019/0156841 A1* 5/2019 Fatus .................... G10L 19/008
2020/0286495 A1 9/2020 Norvell et al.

FOREIGN PATENT DOCUMENTS

| | | | |
|---|---|---|---|
| CN | 102157151 | A | 8/2011 |
| CN | 102157153 | A | 8/2011 |
| CN | 103065636 | A | 4/2013 |
| CN | 103280222 | A | 9/2013 |
| CN | 103854649 | A | 6/2014 |
| CN | 104205211 | A | 12/2014 |
| CN | 104246873 | A | 12/2014 |
| EP | 1845519 | B1 | 9/2009 |
| JP | 2006518482 | A | 8/2006 |
| JP | 2007304604 | A | 11/2007 |
| JP | 2019511864 | A | 4/2019 |
| JP | 2021092805 | A | 6/2021 |
| KR | 20140140102 | A | 12/2014 |
| RU | 2305870 | C2 | 9/2007 |
| RU | 2485606 | C2 | 6/2013 |
| WO | 2007052612 | A1 | 5/2007 |
| WO | 2009081567 | A1 | 7/2009 |
| WO | 2013029225 | A1 | 3/2013 |
| WO | 2013120531 | A1 | 8/2013 |
| WO | 2017153466 | A1 | 9/2017 |

OTHER PUBLICATIONS

Dongil Hyun et al, Robust Interchannel Correlation (ICC) Estimation Using Constant Interchannel Time Difference (ICTD) Compensation, Audio Engineering Society , the 127th Convention, Oct. 9-12, 2009, New York, USA, 6 pages.

* cited by examiner

METHOD FOR ENCODING MULTI-CHANNEL SIGNAL AND ENCODER

CROSS-REFERENCE TO RELATED APPLICATIONS

This application is a continuation of U.S. patent application Ser. No. 17/536,932 filed on Nov. 29, 2021, which is a continuation of U.S. patent application Ser. No. 16/818,612 filed on Mar. 13, 2020, now U.S. Pat. No. 11,217,257, which is a continuation of U.S. patent application Ser. No. 16/272,394 filed on Feb. 11, 2019, now U.S. Pat. No. 10,643,625, which is a continuation of International Patent Application No. PCT/CN2017/074425 filed on Feb. 22, 2017, which claims priority to Chinese Patent Application No. 201610652507.4 filed on Aug. 10, 2016. All of the aforementioned patent applications are hereby incorporated by reference in their entireties.

TECHNICAL FIELD

This application relates to the audio signal encoding field, and in particular, to a method for encoding a multi-channel signal and an encoder.

BACKGROUND

As living quality improves, people impose increasing requirements on high-quality audio. Compared with a mono signal, stereo has a sense of direction and a sense of distribution for various acoustic sources, can improve clarity, intelligibility, and immersive experience of sound, and is therefore highly favored by people.

Stereo processing technologies mainly include mid/side (MS) encoding, intensity stereo (IS) encoding, and parametric stereo (PS) encoding.

In the MS encoding, MS conversion is performed on two signals based on inter-channel coherence (IC), and energy of channels is mainly focused on a mid channel such that inter-channel redundancy is eliminated. In the MS encoding technology, reduction of a code rate depends on coherence between input signals. When coherence between a left-channel signal and a right-channel signal is poor, the left-channel signal and the right-channel signal need to be transmitted separately.

In the IS encoding, high-frequency components of a left-channel signal and a right-channel signal are simplified based on a feature that a human auditory system is insensitive to a phase difference between high-frequency components (for example, components above 2 kilohertz (kHz)) of channels. However, the IS encoding technology is effective only for high-frequency components. If the IS encoding technology is extended to a low frequency, severe man-made noise is caused.

The PS encoding is an encoding scheme based on a binaural auditory model. As shown in FIG. 1 (in FIG. 1, xL is a left-channel time-domain signal, and xR is a right-channel time-domain signal), in a PS encoding process, an encoder side converts a stereo signal into a mono signal and a few spatial parameters (or spatial awareness parameters) that describe a spatial sound field. As shown in FIG. 2, after obtaining the mono signal and the spatial parameters, a decoder side restores a stereo signal with reference to the spatial parameters. Compared with the MS encoding, the PS encoding has a higher compression ratio. Therefore, in the PS encoding, a higher encoding gain can be obtained while relatively good sound quality is maintained. In addition, the PS encoding may be performed in full audio bandwidth, and can well restore a spatial awareness effect of stereo.

In the PS encoding, the spatial parameters include IC, an inter-channel level difference (ILD), an inter-channel time difference (ITD), and an inter-channel phase difference (IPD). The IC describes inter-channel cross correlation or coherence. This parameter determines awareness of a sound field range, and can improve a sense of space and sound stability of an audio signal. The ILD is used to distinguish a horizontal azimuth angle of a stereo acoustic source, and describes an inter-channel energy difference. This parameter affects frequency components of an entire spectrum. The ITD and the IPD are spatial parameters representing horizontal azimuth of an acoustic source, and describe inter-channel time and phase differences. The ILD, the ITD, and the IPD can determine awareness of a human ear to a location of an acoustic source, can be used to effectively determine a sound field location, and plays an important role in restoration of a stereo signal.

In a stereo recording process, due to impact of factors such as background noise, reverberation, and multi-party speech, an ITD calculated according to an existing PS encoding scheme is always unstable (an ITD value transits greatly). A downmixed signal calculated based on such an ITD 15 discontinuous. As a result, quality of stereo obtained on the decoder side is poor. For example, an acoustic image of the stereo played on the decoder side jitters frequently, and auditory freezing even occurs.

SUMMARY

This application provides a method for encoding a multi-channel signal and an encoder to improve stability of an ITD in PS encoding and improve encoding quality of a multi-channel signal.

According to a first aspect, a method for encoding a multi-channel signal is provided, including obtaining a multi-channel signal of a current frame, determining an initial ITD value of the current frame, controlling, based on characteristic information of the multi-channel signal, a quantity of target frames that are allowed to appear continuously, where the characteristic information includes at least one of a signal-to-noise ratio parameter of the multi-channel signal and a peak feature of cross correlation coefficients of the multi-channel signal, and an ITD value of a previous frame of the target frame is reused as an ITD value of the target frame, determining an ITD value of the current frame based on the initial ITD value of the current frame and the quantity of target frames that are allowed to appear continuously, and encoding the multi-channel signal based on the ITD value of the current frame.

With reference to the first aspect, in some implementations of the first aspect, before controlling, based on characteristic information of the multi-channel signal, a quantity of target frames that are allowed to appear continuously, the method further includes determining the peak feature of the cross correlation coefficients of the multi-channel signal based on amplitude of a peak value of the cross correlation coefficients of the multi-channel signal and an index of a peak position of the cross correlation coefficients of the multi-channel signal.

With reference to the first aspect, in some implementations of the first aspect, determining the peak feature of the cross correlation coefficients of the multi-channel signal based on amplitude of a peak value of the cross correlation coefficients of the multi-channel signal and an index of a peak position of the cross correlation coefficients of the multi-channel signal includes determining a peak amplitude confidence parameter based on the amplitude of the peak value of the cross correlation coefficients of the multi-channel signal, where the peak amplitude confidence parameter represents a confidence level of the amplitude of the peak value of the cross correlation coefficients of the multi-channel signal, determining a peak position fluctuation parameter based on an ITD value corresponding to the index of the peak position of the cross correlation coefficients of the multi-channel signal, and an ITD value of a previous frame of the current frame, where the peak position fluctuation parameter represents a difference between the ITD value corresponding to the index of the peak position of the cross correlation coefficients of the multi-channel signal and the ITD value of the previous frame of the current frame, and determining the peak feature of the cross correlation coefficients of the multi-channel signal based on the peak amplitude confidence parameter and the peak position fluctuation parameter.

With reference to the first aspect, in some implementations of the first aspect, determining a peak amplitude confidence parameter based on the amplitude of the peak value of the cross correlation coefficients of the multi-channel signal includes determining, as the peak amplitude confidence parameter, a ratio of a difference between an amplitude value of the peak value of the cross correlation coefficients of the multi-channel signal and an amplitude value of a second largest value of the cross correlation coefficients of the multi-channel signal to the amplitude value of the peak value.

With reference to the first aspect, in some implementations of the first aspect, determining a peak position fluctuation parameter based on an ITD value corresponding to the index of the peak position of the cross correlation coefficients of the multi-channel signal, and an ITD value of a previous frame of the current frame includes determining, as the peak position fluctuation parameter, an absolute value of a difference between the ITD value corresponding to the index of the peak position of the cross correlation coefficients of the multi-channel signal and the ITD value of the previous frame of the current frame.

With reference to the first aspect, in some implementations of the first aspect, controlling, based on characteristic information of the multi-channel signal, a quantity of target frames that are allowed to appear continuously includes controlling, based on the peak feature of the cross correlation coefficients of the multi-channel signal, the quantity of target frames that are allowed to appear continuously, and when the peak feature of the cross correlation coefficients of the multi-channel signal meets a preset condition, reducing, by adjusting at least one of a target frame count and a threshold of the target frame count, the quantity of target frames that are allowed to appear continuously, where the target frame count is used to represent a quantity of target frames that have currently appeared continuously, and the threshold of the target frame count is used to indicate the quantity of target frames that are allowed to appear continuously.

With reference to the first aspect, in some implementations of the first aspect, reducing, by adjusting at least one of a target frame count and a threshold of the target frame count, the quantity of target frames that are allowed to appear continuously includes reducing, by increasing the target frame count, the quantity of target frames that are allowed to appear continuously.

With reference to the first aspect, in some implementations of the first aspect, reducing, by adjusting at least one of a target frame count and a threshold of the target frame count, the quantity of target frames that are allowed to appear continuously includes reducing, by decreasing the threshold of the target frame count, the quantity of target frames that are allowed to appear continuously.

With reference to the first aspect, in some implementations of the first aspect, controlling, based on the peak feature of the cross correlation coefficients of the multi-channel signal, the quantity of target frames that are allowed to appear continuously includes only when the signal-to-noise ratio parameter of the multi-channel signal does not meet a preset signal-to-noise ratio condition, controlling, based on the peak feature of the cross correlation coefficients of the multi-channel signal, the quantity of target frames that are allowed to appear continuously, and the method further includes, when a signal-to-noise ratio of the multi-channel signal meets the signal-to-noise ratio condition, stopping reusing the ITD value of the previous frame of the current frame as the ITD value of the current frame.

With reference to the first aspect, in some implementations of the first aspect, controlling, based on characteristic information of the multi-channel signal, a quantity of target frames that are allowed to appear continuously includes determining whether the signal-to-noise ratio parameter of the multi-channel signal meets a preset signal-to-noise ratio condition, and when the signal-to-noise ratio parameter of the multi-channel signal does not meet the signal-to-noise ratio condition, controlling, based on the peak feature of the cross correlation coefficients of the multi-channel signal, the quantity of target frames that are allowed to appear continuously, or when a signal-to-noise ratio of the multi-channel signal meets the signal-to-noise ratio condition, stopping reusing the ITD value of the previous frame of the current frame as the ITD value of the current frame.

With reference to the first aspect, in some implementations of the first aspect, stopping reusing the ITD value of the previous frame of the current frame as the ITD value of the current frame includes increasing the target frame count such that a value of the target frame count is greater than or equal to the threshold of the target frame count, where the target frame count is used to represent the quantity of target frames that have currently appeared continuously, and the threshold of the target frame count is used to indicate the quantity of target frames that are allowed to appear continuously.

With reference to the first aspect, in some implementations of the first aspect, determining an ITD value of the current frame based on the initial ITD value of the current frame and the quantity of target frames that are allowed to appear continuously includes determining the ITD value of the current frame based on the initial ITD value of the current frame, the target frame count, and the threshold of the target frame count, where the target frame count is used to represent the quantity of target frames that have currently appeared continuously, and the threshold of the target frame count is used to indicate the quantity of target frames that are allowed to appear continuously.

With reference to the first aspect, in some implementations of the first aspect, the signal-to-noise ratio parameter is a modified segmental signal-to-noise ratio of the multi-channel signal.

According to a second aspect, an encoder is provided, including units configured to perform the method in the first aspect.

According to a third aspect, an encoder is provided, including a memory and a processor. The memory is configured to store a program, and the processor is configured to execute the program. When the program is executed, the processor performs the method in the first aspect.

According to a fourth aspect, a computer-readable medium is provided. The computer-readable medium stores program code to be executed by an encoder. The program code includes an instruction used to perform the method in the first aspect.

According to this application, impact of environmental factors, such as background noise, reverberation, and multi-party speech, on accuracy and stability of a calculation result of an ITD value can be reduced, and when there is background noise, reverberation, or multi-party speech, or a signal harmonic characteristic is unapparent, stability of an ITD value in PS encoding is improved, and unnecessary transitions of the ITD value are reduced to the greatest extent, thereby avoiding inter-frame discontinuity of a downmixed signal and instability of an acoustic image of a decoded signal. In addition, according to embodiments of this application, phase information of a stereo signal can be better retained, and acoustic quality is improved.

DESCRIPTION OF EMBODIMENTS

Figure 1:
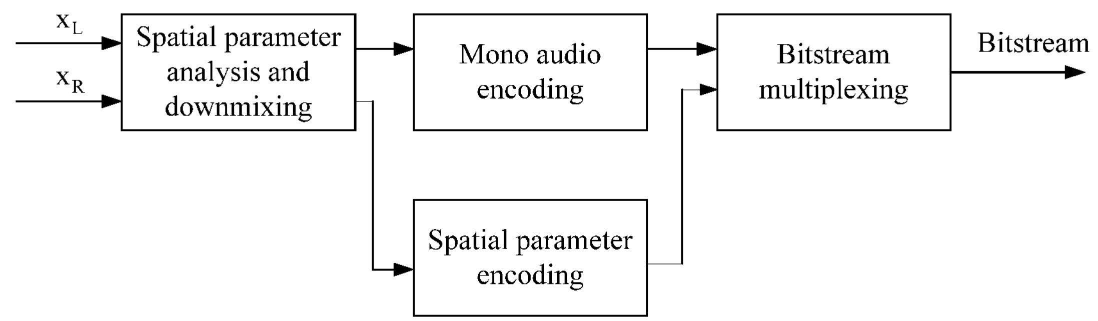
FIG. 1 is a flowchart of PS encoding.
Figure 2:
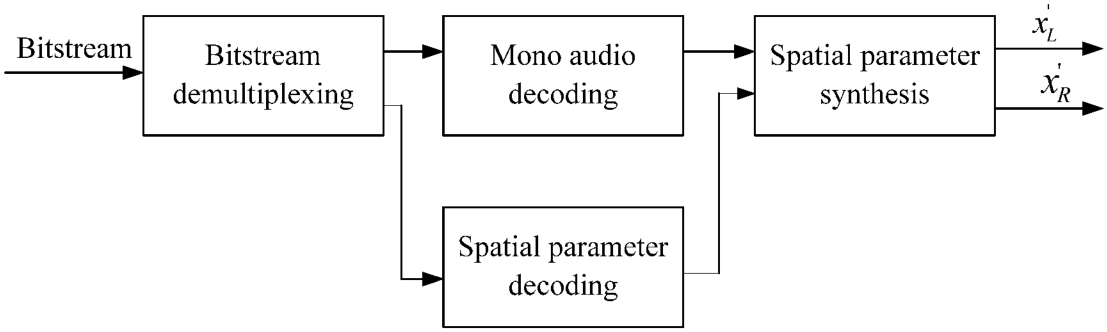
FIG. 2 is a flowchart of PS decoding.

It should be noted that a stereo signal may also be referred to as a multi-channel signal. The foregoing briefly describes functions and meanings of an ILD, an ITD, and an IPD of the multi-channel signal. For ease of understanding, the following describes the ILD, the ITD, and the IPD in a more detailed manner using an example in which a signal picked up by a first microphone is a first-channel signal, and a signal picked up by a second microphone is a second-channel signal.

The ILD describes an energy difference between the first-channel signal and the second-channel signal. For example, if the ILD is greater than 0, energy of the first-channel signal is higher than energy of the second-channel signal, if the ILD is equal to 0, energy of the first-channel signal is equal to energy of the second-channel signal, or if the ILD is less than 0, energy of the first-channel signal is less than energy of the second-channel signal. For another example, if the ILD is less than 0, energy of the first-channel signal is higher than energy of the second-channel signal, if the ILD is equal to 0, energy of the first-channel signal is equal to energy of the second-channel signal, or if the ILD is greater than 0, energy of the first-channel signal is less than energy of the second-channel signal. It should be understood that the foregoing values are merely examples, and a relationship between an ILD value and the energy difference between the first-channel signal and the second-channel signal may be defined based on experience or depending on an actual requirement.

The ITD describes a time difference between the first-channel signal and the second-channel signal, that is, a difference between a time at which sound generated by an acoustic source arrives at the first microphone and a time at which the sound generated by the acoustic source arrives at the second microphone. For example, if the ITD is greater than 0, the time at which the sound generated by the acoustic source arrives at the first microphone is earlier than the time at which the sound generated by the acoustic source arrives at the second microphone, if the ITD is equal to 0, the sound generated by the acoustic source simultaneously arrives at the first microphone and the second microphone, or if the ITD is less than 0, the time at which the sound generated by the acoustic source arrives at the first microphone is later than the time at which the sound generated by the acoustic source arrives at the second microphone. For another example, if the ITD is less than 0, the time at which the sound generated by the acoustic source arrives at the first microphone is earlier than the time at which the sound generated by the acoustic source arrives at the second microphone, if the ITD is equal to 0, the sound generated by the acoustic source simultaneously arrives at the first microphone and the second microphone, or if the ITD is greater than 0, the time at which the sound generated by the acoustic source arrives at the first microphone is later than the time at which the sound generated by the acoustic source arrives at the second microphone. It should be understood that the foregoing values are merely examples, and a relationship between an ITD value and the time difference between the first-channel signal and the second-channel signal may be defined based on experience or depending on an actual requirement.

The IPD describes a phase difference between the first-channel signal and the second-channel signal. This parameter is usually used together with the ITD, and is used to restore phase information of a multi-channel signal on a decoder side.

It can be learned from the foregoing that an existing ITD value calculation manner causes discontinuity of an ITD value. For ease of understanding, with reference to FIG. 3 and FIG. 4, the following describes in detail the existing ITD value calculation manner and disadvantages thereof using an example in which a multi-channel signal includes a left-channel signal and a right-channel signal.

In an embodiment, an ITD value is calculated based on a cross correlation coefficient of a multi-channel signal in most cases. There may be a plurality of specific calculation manners. For example, the ITD value may be calculated in time domain, or the ITD value may be calculated in frequency domain.

Figure 3:
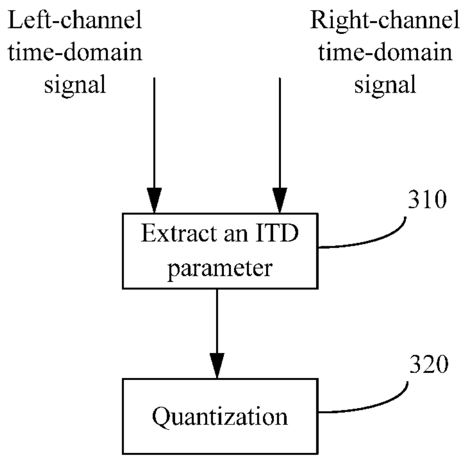
FIG. 3 is a schematic flowchart of a time-domain-based ITD parameter extraction method.

FIG. 3 is a schematic flowchart of a time-domain-based ITD value calculation method. The method in FIG. 3 includes the following steps.

Step 310: Calculate an ITD value based on a left-channel time-domain signal and a right-channel time-domain signal.

Further, the ITD value may be calculated based on the left-channel time-domain signal and the right-channel time-domain signal using a time-domain cross-correlation function. For example, calculation is performed within a range of 0≤i≤Tmax:

$$c_n(i) = \sum_{j=0}^{Length-1-i} x_R(j) \cdot x_L(j+i), \tag{1}$$

-continued $$c_p(i)=\sum_{j=0}^{Length-1-i} x_L(j)\cdot x_R(j+i). \quad (2)$$

If $$\max_{0\le i\le T_{max}}(c_n(i)) > \max_{0\le i\le T_{max}}(c_p(i)),$$

$T_1$ is an opposite number of an index value corresponding to $\max(C_n(i))$, otherwise, $T_1$ is an index value corresponding to $\max(C_p(i))$, where i is an index value of the cross-correlation function, x L is the left-channel time-domain signal, $x_R$ is the right-channel time-domain signal, $T_{max}$ corresponds to a maximum ITD value in a case of different sampling rates, and Length is a frame length.

Step 320: Perform quantization processing on the ITD value.

Figure 4:
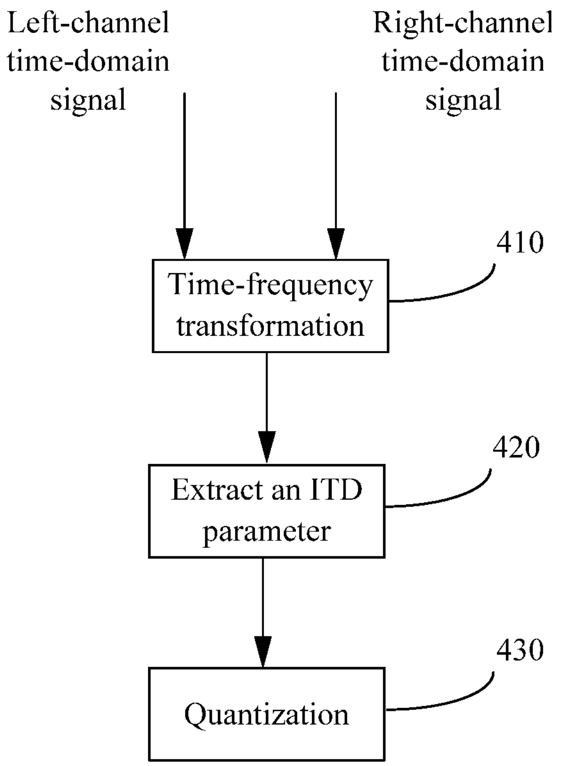
FIG. 4 is a schematic flowchart of a frequency-domain-based ITD parameter extraction method.

FIG. 4 is a schematic flowchart of a frequency-domain-based ITD value calculation method. The method in FIG. 4 includes the following steps.

Step 410: Perform time-frequency transformation on a left-channel time-domain signal and a right-channel time-domain signal to obtain a left-channel frequency-domain signal and a right-channel frequency-domain signal.

Further, in the time-frequency transformation, a time-domain signal may be transformed into a frequency-domain signal using a technology such as discrete Fourier transform (DFT) or modified discrete cosine transform (MDCT).

For example, DFT may be performed on the entered left-channel time-domain signal and right-channel time-domain signal using the following formula (3):

$$X(k)=\sum_{n=0}^{Length-1} x(n)\cdot e^{-j\frac{2\pi\cdot n\cdot k}{L}},\ 0\le k<L, \quad (3)$$

where n is an index value of a sample of a time-domain signal, k is an index value of a frequency bin of a frequency-domain signal, L is a time-frequency transformation length, and x(n) is the left-channel time-domain signal or the right-channel time-domain signal.

Step 420: Extract an ITD value based on the left-channel frequency-domain signal and the right-channel frequency-domain signal.

Further, L frequency bins of each of the left-channel frequency-domain signal and the right-channel frequency-domain signal may be divided into N subbands. A value range of frequency bins included in a $b^{th}$ subband in the N subbands may be defined as $A_{b-1}\le k\le A_b-1$. In a search range of $-T_{max}\le j\le T_{max}$, an amplitude value may be calculated using the following formula:

$$mag(j)=\sum_{k=A_{b-1}}^{A_b-1} X_L(k)*X_R(k)*\exp\left(\frac{2\pi*k*j}{L}\right). \quad (4)$$

Then, an ITD value of the $b_{th}$ subband may be $$T(k)=\arg\max_{-T_{max}\le j\le T_{max}}(mag(j)),$$

that is, an index value of a sample corresponding to a maximum value calculated according to the formula (4).

Step 430: Perform quantization processing on the ITD value.

In the other approaches, if a peak value of a cross correlation coefficient of a multi-channel signal in a current frame is relatively small, an ITD value obtained through calculation may be considered inaccurate. In this case, the ITD value of the current frame is zeroed.

Due to impact of factors such as background noise, reverberation, and multi-party speech, an ITD value calculated according to an existing PS encoding scheme is frequently zeroed, and consequently, the ITD value transits greatly. A downmixed signal calculated based on such an ITD value is subject to inter-frame discontinuity, and an acoustic image of a decoded multi-channel signal is unstable. Consequently, poor acoustic quality of the multi-channel signal is caused.

To resolve the problem that the ITD value transits greatly, a feasible processing manner is as follows. When the ITD value, obtained through calculation, of the current frame is considered inaccurate, an ITD value of a previous frame of the current frame (a previous frame of a frame is a previous frame adjacent to the frame) may be reused for the current frame, that is, the ITD value of the previous frame of the current frame is used as the ITD value of the current frame. In this processing manner, the problem that the ITD value transits greatly can be well resolved. However, this processing manner may cause the following problem. When signal quality of the multi-channel signal is relatively good, relatively accurate ITD values, obtained through calculation, of many current frames may also be improperly discarded, and ITD values of previous frames of the current frames are reused. Consequently, phase information of the multi-channel signal is lost.

Figure 5:
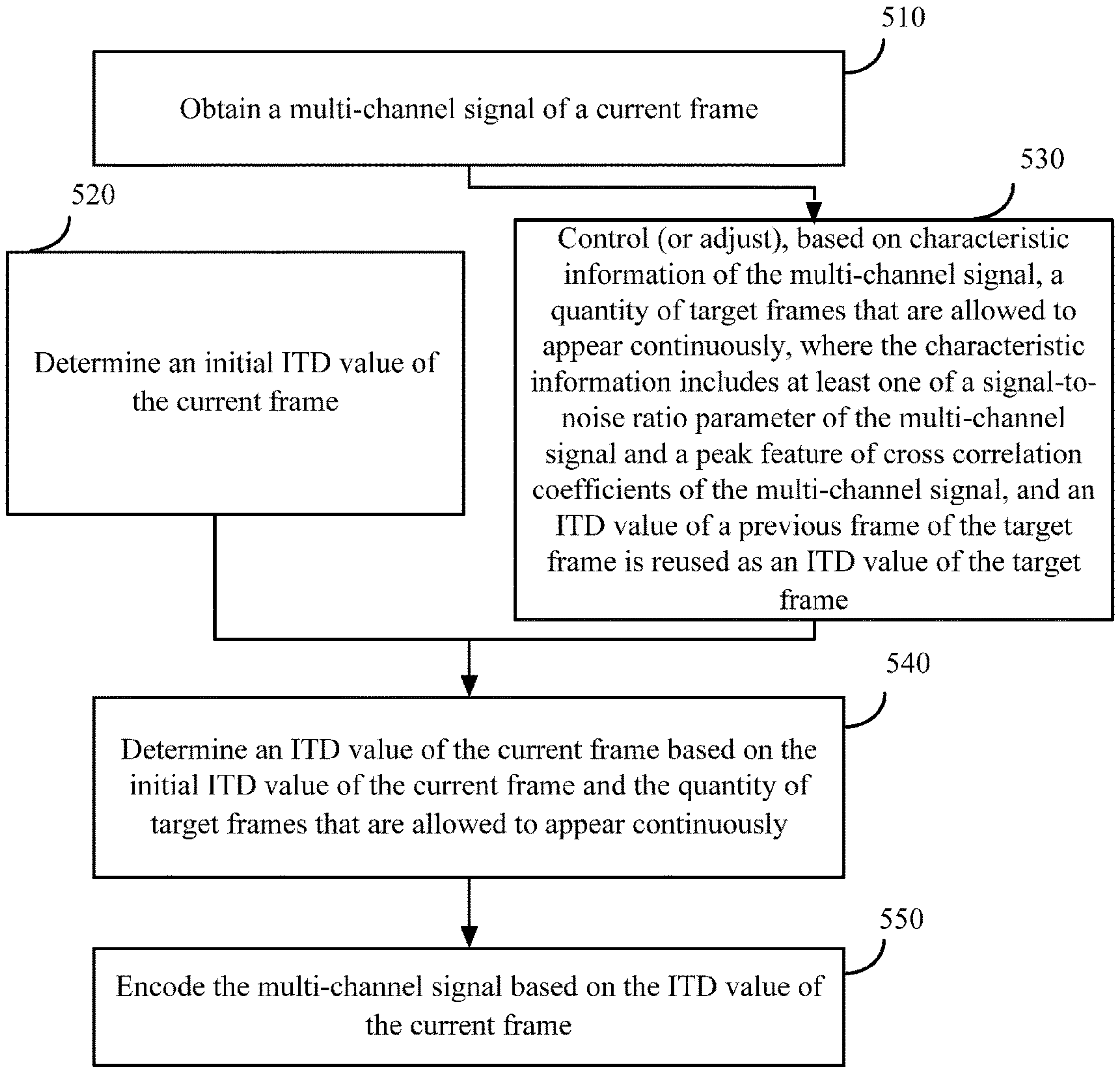
FIG. 5 is a schematic flowchart of a method for encoding a multi-channel signal according to an embodiment of this application.

To avoid the problem that the ITD value transits greatly and better retain the phase information of the multi-channel signal, with reference to FIG. 5, the following describes in detail a method for encoding a multi-channel signal according to an embodiment of this application. It should be noted that, for ease of description, a frame whose ITD value reuses an ITD value of a previous frame is referred to as a target frame below.

The method in FIG. 5 includes the following steps.

Step 510: Obtain a multi-channel signal of a current frame.

Step 520: Determine an initial ITD value of the current frame.

For example, the initial ITD value of the current frame may be calculated in the time-domain-based manner shown in FIG. 3. For another example, the initial ITD value of the current frame may be calculated in the frequency-domain-based manner shown in FIG. 4.

Step 530: Control (or adjust), based on characteristic information of the multi-channel signal, a quantity of target frames that are allowed to appear continuously, where the characteristic information includes at least one of a signal-to-noise ratio parameter of the multi-channel signal and a peak feature of cross correlation coefficients of the multi-channel signal, and an ITD value of a previous frame of the target frame is reused as an ITD value of the target frame.

It should be understood that, in this embodiment of this application, the initial ITD value of the current frame is first calculated, and then an ITD value of the current frame (or referred to as an actual ITD value of the current frame, or referred to as a final ITD value of the current frame) is determined based on the initial ITD value of the current frame. The initial ITD value of the current frame and the ITD value of the current frame may be a same ITD value, or may be different ITD values. This depends on a specific calculation rule. For example, if the initial ITD value is accurate, the initial ITD value may be used as the ITD value of the current frame. For another example, if the initial ITD value is inaccurate, the initial ITD value of the current frame may be discarded, and an ITD value of a previous frame of the current frame is used as the ITD value of the current frame.

It should be understood that the peak feature of the cross correlation coefficients of the multi-channel signal of the current frame may be a differential feature between an amplitude value (or referred to as magnitude) of a peak value (or referred to as a maximum value) of the cross correlation coefficients of the multi-channel signal of the current frame and an amplitude value of a second largest value of the cross correlation coefficients of the multi-channel signal, may be a differential feature between an amplitude value of a peak value of the cross correlation coefficients of the multi-channel signal of the current frame and a threshold, may be a differential feature between an ITD value corresponding to an index of a peak position of the cross correlation coefficients of the multi-channel signal of the current frame and an ITD value of previous N frames, may be a differential feature (or referred to as a fluctuation feature) between an index of a peak position of the cross correlation coefficients of the multi-channel signal of the current frame and an index of a peak position of a cross correlation coefficient of a multi-channel signal of previous N frames, where N is a positive integer greater than or equal to 1, or may be a combination of the foregoing features. The index of the peak position of the cross correlation coefficients of the multi-channel signal of the current frame may represent which value of the cross correlation coefficients of the multi-channel signal in the current frame is the peak value. Likewise, an index of a peak position of a cross correlation coefficient of a multi-channel signal of the previous frame may represent which value of the cross correlation coefficients of the multi-channel signal in the previous frame is a peak value. For example, that the index of the peak position of the cross correlation coefficients of the multi-channel signal of the current frame is 5 indicates that a fifth value of the cross correlation coefficients of the multi-channel signal in the current frame is the peak value. For another example, that the index of the peak position of the cross correlation coefficients of the multi-channel signal of the previous frame is 4 indicates that a fourth value of the cross correlation coefficients of the multi-channel signal in the previous frame is the peak value.

The controlling a quantity of target frames that are allowed to appear continuously in step 530 may be implemented by setting a target frame count and/or a threshold of the target frame count. For example, the objective of the controlling a quantity of target frames that are allowed to appear continuously may be achieved by forcibly changing the target frame count, the objective of the controlling a quantity of target frames that are allowed to appear continuously may be achieved by forcibly changing the threshold of the target frame count, or certainly, the objective of the controlling a quantity of target frames that are allowed to appear continuously may be achieved by forcibly changing both the target frame count and the threshold of the target frame count. The target frame count may be used to indicate a quantity of target frames that have currently appeared continuously, and the threshold of the target frame count may be used to indicate the quantity of target frames that are allowed to appear continuously.

Step 540: Determine an ITD value of the current frame based on the initial ITD value of the current frame and the quantity of target frames that are allowed to appear continuously.

Step 550: Encode the multi-channel signal based on the ITD value of the current frame.

For example, operations, such as mono audio encoding, spatial parameter encoding, and bitstream multiplexing, shown in FIG. 1 may be performed. For a specific encoding scheme, refer to the other approaches.

According to this embodiment of this application, impact of environmental factors, such as background noise, reverberation, and multi-party speech, on accuracy and stability of a calculation result of an ITD value can be reduced, and when there is background noise, reverberation, or multi-party speech, or a signal harmonic characteristic is unapparent, stability of an ITD value in PS encoding is improved, and unnecessary transitions of the ITD value are reduced to the greatest extent, thereby avoiding inter-frame discontinuity of a downmixed signal and instability of an acoustic image of a decoded signal. In addition, according to this embodiment of this application, phase information of a stereo signal can be better retained, and acoustic quality is improved.

It should be noted that the multi-channel signal appearing below is the multi-channel signal of the current frame, unless otherwise specified that the multi-channel signal is the multi-channel signal of the previous frame or the previous N frames.

Before step 530, the method in FIG. 5 may further include determining the peak feature of the cross correlation coefficients of the multi-channel signal based on amplitude of a peak value of the cross correlation coefficients of the multi-channel signal.

Further, a peak amplitude confidence parameter may be determined based on the amplitude of the peak value of the cross correlation coefficients of the multi-channel signal, where the peak amplitude confidence parameter may be used to represent a confidence level of the amplitude of the peak value of the cross correlation coefficients of the multi-channel signal. Further, step 530 may include, when the peak amplitude confidence parameter meets a preset condition, reducing the quantity of target frames that are allowed to appear continuously, or when the peak amplitude confidence parameter does not meet a preset condition, keeping the quantity of target frames that are allowed to appear continuously unchanged. For example, that the peak amplitude confidence parameter meets a preset condition may be that a value of the peak amplitude confidence parameter is greater than a threshold, or may be that a value of the peak amplitude confidence parameter is within a preset range.

In this embodiment of this application, the peak amplitude confidence parameter may be defined in a plurality of manners.

For example, the peak amplitude confidence parameter may be a difference between the amplitude value of the peak value of the cross correlation coefficients of the multi-channel signal and the amplitude value of the second largest value of the cross correlation coefficients of the multi-channel signal. Further, a larger difference indicates a higher confidence level of the amplitude of the peak value.

For another example, the peak amplitude confidence parameter may be a ratio of a difference between the amplitude value of the peak value of the cross correlation coefficients of the multi-channel signal and the amplitude value of the second largest value of the cross correlation coefficients of the multi-channel signal to the amplitude value of the peak value. Further, a larger ratio indicates a higher confidence level of the amplitude of the peak value.

For another example, the peak amplitude confidence parameter may be a difference between the amplitude value of the peak value of the cross correlation coefficients of the multi-channel signal and a target amplitude value. Further, a larger absolute value of the difference indicates a higher confidence level of the amplitude of the peak value. The target amplitude value may be selected based on experience or depending on an actual case, for example, may be a fixed value, or may be an amplitude value of a cross correlation coefficient of a preset location (the location may be represented using an index of the cross correlation coefficient) in the current frame.

For another example, the peak amplitude confidence parameter may be a ratio of a difference between the amplitude value of the peak value of the cross correlation coefficients of the multi-channel signal and a target amplitude value to the amplitude value of the peak value. Further, a larger ratio indicates a higher confidence level of the amplitude of the peak value. The target amplitude value may be selected based on experience or depending on an actual case, for example, may be a fixed value, or may be an amplitude value of a cross correlation coefficient of a preset location in the current frame.

Optionally, in some embodiments, before step 530, the method in FIG. 5 may further include determining the peak feature of the cross correlation coefficients of the multi-channel signal of the current frame based on an index of a peak position of the cross correlation coefficients of the multi-channel signal.

For example, a peak position fluctuation parameter may be determined based on an ITD value corresponding to the index of the peak position of the cross correlation coefficients of the multi-channel signal and an ITD value of previous N frames of the current frame, where the peak position fluctuation parameter may be used to represent a difference between the ITD value corresponding to the index of the peak position of the cross correlation coefficients of the multi-channel signal and the ITD value of the previous frame of the current frame, and N is a positive integer greater than or equal to 1.

For another example, a peak position fluctuation parameter may be determined based on the index of the peak position of the cross correlation coefficients of the multi-channel signal and an index of a peak position of a cross correlation coefficient of a multi-channel signal of previous N frames of the current frame, where the peak position fluctuation parameter may be used to represent a difference between the index of the peak position of the cross correlation coefficients of the multi-channel signal and the index of the peak position of the cross correlation coefficients of the multi-channel signal of the previous N frames of the current frame.

Further, step 530 may include, when the peak position fluctuation parameter meets a preset condition, reducing the quantity of target frames that are allowed to appear continuously, or when the peak position fluctuation parameter does not meet a preset condition, keeping the quantity of target frames that are allowed to appear continuously unchanged. For example, that the peak position fluctuation parameter meets a preset condition may be that a value of the peak position fluctuation parameter is greater than a threshold, or may be that a value of the peak position fluctuation parameter is within a preset range. For example, when the peak position fluctuation parameter is determined based on the ITD value corresponding to the index of the peak position of the cross correlation coefficients of the multi-channel signal and the ITD value of the previous frame of the current frame, that the peak position fluctuation parameter meets a preset condition may be that a value of the peak position fluctuation parameter is greater than a threshold, where the threshold may be set to 4, 5, 6, or another empirical value, or may be that a value of the peak position fluctuation parameter is within a preset range, where the preset range may be set to [6, 128] or another empirical value. Further, the threshold or the value range may be set depending on different parameter calculation methods, different requirements, different application scenarios, and the like.

In this embodiment of this application, the peak position fluctuation parameter may be defined in a plurality of manners.

For example, the peak position fluctuation parameter may be an absolute value of a difference between the ITD value corresponding to the index of the peak position of the cross correlation coefficients of the multi-channel signal of the current frame and an ITD value corresponding to the index of the peak position of the cross correlation coefficients of the multi-channel signal of the previous frame of the current frame.

For another example, the peak position fluctuation parameter may be an absolute value of the difference between the ITD value corresponding to the index of the peak position of the cross correlation coefficients of the multi-channel signal of the current frame and the ITD value of the previous frame of the current frame.

For another example, the peak position fluctuation parameter may be a variance of a difference between the ITD value corresponding to the index of the peak position of the cross correlation coefficients of the multi-channel signal of the current frame and the ITD value of the previous N frames, where N is an integer greater than or equal to 2.

Optionally, in some embodiments, before step 530, the method in FIG. 5 may further include determining the peak feature of the cross correlation coefficients of the multi-channel signal based on amplitude of a peak value of the cross correlation coefficients of the multi-channel signal and an index of a peak position of the cross correlation coefficients of the multi-channel signal.

Further, a peak amplitude confidence parameter may be determined based on the amplitude of the peak value of the cross correlation coefficients of the multi-channel signal, a peak position fluctuation parameter is determined based on an ITD value corresponding to the index of the peak position of the cross correlation coefficients of the multi-channel signal and an ITD value of a previous frame, and the peak feature of the cross correlation coefficients of the multi-channel signal is determined based on the peak amplitude confidence parameter and the peak position fluctuation parameter. For a manner of defining the peak amplitude confidence parameter and the peak position fluctuation parameter, refer to the foregoing embodiment. Details are not described herein again.

Further, in this embodiment, step 530 may include, if both the peak amplitude confidence parameter and the peak position fluctuation parameter meet a preset condition, controlling the quantity of target frames that are allowed to appear continuously.

For example, when the peak amplitude confidence parameter is greater than a preset peak amplitude confidence threshold, and the peak position fluctuation parameter is greater than a preset peak position fluctuation threshold, the quantity of target frames that are allowed to appear continuously is reduced. Further, for example, when the peak amplitude confidence parameter is a ratio of a difference between the amplitude value of the peak value of the cross correlation coefficients of the multi-channel signal and the amplitude value of the second largest value of the cross correlation coefficients of the multi-channel signal to the amplitude value of the peak value, the peak amplitude confidence threshold may be set to 0.1, 0.2, 0.3, or another empirical value. When the peak position fluctuation parameter is an absolute value of a difference between the ITD value corresponding to the index of the peak position of the cross correlation coefficients of the multi-channel signal of the current frame and an ITD value corresponding to the index of the peak position of the cross correlation coefficients of the multi-channel signal of the previous frame of the current frame, the peak position fluctuation threshold may be set to 4, 5, 6, or another empirical value. Further, the threshold or a value range may be set depending on different parameter calculation methods, different requirements, different application scenarios, and the like.

For another example, when a value of the peak amplitude confidence parameter is between two thresholds, and the peak position fluctuation parameter is greater than a preset peak position fluctuation threshold, the quantity of target frames that are allowed to appear continuously is reduced.

For another example, when a value of the peak amplitude confidence parameter is greater than a preset peak amplitude confidence threshold, and the peak position fluctuation parameter is between two thresholds, the quantity of target frames that are allowed to appear continuously is reduced.

It should be noted that, in some embodiments, the peak amplitude confidence parameter and/or peak position fluctuation parameter described above may be referred to as parameters/a parameter representing a degree of stability of the peak position of the cross correlation coefficients of the multi-channel signal. In this case, step 530 may include, if the degree of stability of the peak position of the cross correlation coefficients of the multi-channel signal meets a preset condition, reducing the quantity of target frames that are allowed to appear continuously.

It should be noted that a defining manner for that the parameter representing the degree of stability of the peak position of the cross correlation coefficients of the multi-channel signal meets the preset condition is not limited in this embodiment of this application.

Optionally, that the degree of stability of the peak position of the cross correlation coefficients of the multi-channel signal meets the preset condition may be a value of one or more of parameters representing the degree of stability of the peak position of the cross correlation coefficients of the multi-channel signal is within a preset value range, or a value of one or more of parameters representing the degree of stability of the peak position of the cross correlation coefficients of the multi-channel signal is beyond a preset value range. For example, when the degree of stability of the peak position of the cross correlation coefficients of the multi-channel signal is represented by the peak position fluctuation parameter, and a method for calculating the peak position fluctuation parameter is based on the absolute value of the difference between the ITD value corresponding to the index of the peak position of the cross correlation coefficients of the multi-channel signal of the current frame and the ITD value corresponding to the index of the peak position of the cross correlation coefficients of the multi-channel signal of the previous frame of the current frame, the preset value range may be set as follows. The peak position fluctuation parameter is greater than 5 or another empirical value. For another example, when the degree of stability of the peak position of the cross correlation coefficients of the multi-channel signal is represented by the peak position fluctuation parameter and the peak amplitude confidence parameter, a method for calculating the peak position fluctuation parameter is based on the absolute value of the difference between the ITD value corresponding to the index of the peak position of the cross correlation coefficients of the multi-channel signal of the current frame and the ITD value corresponding to the index of the peak position of the cross correlation coefficients of the multi-channel signal of the previous frame of the current frame, and the peak amplitude confidence parameter is the ratio of the difference between the amplitude value of the peak value of the cross correlation coefficients of the multi-channel signal and the amplitude value of the second largest value of the cross correlation coefficients of the multi-channel signal to the amplitude value of the peak value, the preset value range may be set as follows. The peak position fluctuation parameter is greater than 5, and the peak amplitude confidence parameter is greater than 0.2, or may be set to another empirical value range. Further, the value range may be set depending on different parameter calculation methods, different requirements, different application scenarios, and the like.

The following describes in detail how to control, based on the signal-to-noise ratio parameter of the multi-channel signal, the quantity of target frames that are allowed to appear continuously.

The signal-to-noise ratio parameter of the multi-channel signal may be used to represent a signal-to-noise ratio of the multi-channel signal.

It should be understood that the signal-to-noise ratio parameter of the multi-channel signal may be represented by one or more parameters. A specific manner of selecting a parameter is not limited in this embodiment of this application. For example, the signal-to-noise ratio parameter of the multi-channel signal may be represented by at least one of a subband signal-to-noise ratio, a modified subband signal-to-noise ratio, a segmental signal-to-noise ratio, a modified segmental signal-to-noise ratio, a full-band signal-to-noise ratio, a modified full-band signal-to-noise ratio, and another parameter that can represent a signal-to-noise ratio feature of the multi-channel signal.

It should be further understood that a manner of determining the signal-to-noise ratio parameter of the multi-channel signal is not limited in this embodiment of this application. For example, the signal-to-noise ratio parameter of the multi-channel signal may be calculated using the entire multi-channel signal. For another example, the signal-to-noise ratio parameter of the multi-channel signal may be calculated using some signals of the multi-channel signal, that is, the signal-to-noise ratio of the multi-channel signal is represented using signal-to-noise ratios of some signals. For another example, a signal of any channel may be adaptively selected from the multi-channel signal to perform calculation, that is, the signal-to-noise ratio of the multi-channel signal is represented using a signal-to-noise ratio of the signal of the channel. For another example, weighted averaging may be first performed on data representing the multi-channel signal to form a new signal, and then the signal-to-noise ratio of the multi-channel signal is represented using a signal-to-noise ratio of the new signal.

The following describes, using an example in which the multi-channel signal includes a left-channel signal and a right-channel signal, a manner of calculating the signal-to-noise ratio of the multi-channel signal.

For example, time-frequency transformation may be first performed on a left-channel time-domain signal and a right-channel time-domain signal to obtain a left-channel frequency-domain signal and a right-channel frequency-domain signal, weighted averaging is performed on an amplitude spectrum of the left-channel frequency-domain signal and an amplitude spectrum of the right-channel frequency-domain signal, to obtain an average amplitude spectrum of the left-channel frequency-domain signal and the right-channel frequency-domain signal, and then a modified segmental signal-to-noise ratio is calculated based on the average amplitude spectrum, and is used as a parameter representing the signal-to-noise ratio feature of the multi-channel signal.

For another example, time-frequency transformation may be first performed on a left-channel time-domain signal to obtain a left-channel frequency-domain signal, and then a modified segmental signal-to-noise ratio of the left-channel frequency-domain signal is calculated based on an amplitude spectrum of the left-channel frequency-domain signal. Likewise, time-frequency transformation may be first performed on a right-channel time-domain signal to obtain a right-channel frequency-domain signal, and then a modified segmental signal-to-noise ratio of the right-channel frequency-domain signal is calculated based on an amplitude spectrum of the right-channel frequency-domain signal. Then an average value of modified segmental signal-to-noise ratios of the left-channel frequency-domain signal and the right-channel frequency-domain signal is calculated based on the modified segmental signal-to-noise ratio of the left-channel frequency-domain signal and the modified segmental signal-to-noise ratio of the right-channel frequency-domain signal, and is used as a parameter representing the signal-to-noise ratio feature of the multi-channel signal.

The controlling, based on the signal-to-noise ratio parameter of the multi-channel signal, the quantity of target frames that are allowed to appear continuously may include, when the signal-to-noise ratio parameter of the multi-channel signal meets a preset condition, reducing the quantity of target frames that are allowed to appear continuously, or when the signal-to-noise ratio parameter of the multi-channel signal does not meet a preset condition, keeping the quantity of target frames that are allowed to appear continuously unchanged. For example, when a value of the signal-to-noise ratio parameter of the multi-channel signal is greater than a preset threshold, the quantity of target frames that are allowed to appear continuously is reduced. For another example, when a value of the signal-to-noise ratio parameter of the multi-channel signal is within a preset value range, the quantity of target frames that are allowed to appear continuously is reduced. For another example, when a value of the signal-to-noise ratio parameter of the multi-channel signal is beyond a preset value range, the quantity of target frames that are allowed to appear continuously is reduced. For example, when the signal-to-noise ratio parameter of the multi-channel signal is the segmental signal-to-noise ratio, the preset threshold may be 6000 or another empirical value, and the preset value range may be greater than 6000 and less than 3000000, or another empirical value range. Further, the threshold or the value range may be set depending on different parameter calculation methods, different requirements, different application scenarios, and the like.

The foregoing mainly describes how to control, based on the peak feature of the cross correlation coefficients of the multi-channel signal or the signal-to-noise ratio parameter of the multi-channel signal, the quantity of target frames that are allowed to appear continuously. The following describes in detail how to control, based on the signal-to-noise ratio parameter of the multi-channel signal and the peak feature of the cross correlation coefficients of the multi-channel signal, the quantity of target frames that are allowed to appear continuously.

Further, when the signal-to-noise ratio parameter of the multi-channel signal meets the preset condition, and the peak amplitude confidence parameter and/or the peak position fluctuation parameter of the cross correlation coefficients of the multi-channel signal meet/meets the preset condition, the quantity of target frames that are allowed to appear continuously may be reduced.

For example, when the value of the signal-to-noise ratio parameter of the multi-channel signal is greater than a first threshold and less than or equal to a second threshold, the peak amplitude confidence parameter is greater than a third threshold, and the peak position fluctuation parameter is greater than a fourth threshold, the quantity of target frames that are allowed to appear continuously is reduced. For example, when the signal-to-noise ratio parameter of the multi-channel signal is the segmental signal-to-noise ratio, the first threshold may be 5000, 6000, 7000, or another empirical value, and the second threshold may be 2900000, 3000000, 3100000, or another empirical value. When the peak amplitude confidence parameter is the ratio of the difference between the amplitude value of the peak value of the cross correlation coefficients of the multi-channel signal and the amplitude value of the second largest value of the cross correlation coefficients of the multi-channel signal to the amplitude value of the peak value, the third threshold may be set to 0.1, 0.2, 0.3, or another empirical value. When the peak position fluctuation parameter is the absolute value of the difference between the ITD value corresponding to the index of the peak position of the cross correlation coefficients of the multi-channel signal of the current frame and the ITD value corresponding to the index of the peak position of the cross correlation coefficients of the multi-channel signal of the previous frame of the current frame, the fourth threshold may be set to 4, 5, 6, or another empirical value. Further, the thresholds may be set depending on different parameter calculation methods, different requirements, different application scenarios, and the like.

For another example, when the value of the signal-to-noise ratio parameter of the multi-channel signal is greater than or equal to a first threshold and less than or equal to a second threshold, and the peak amplitude confidence parameter is less than a fifth threshold, the quantity of target frames that are allowed to appear continuously is reduced. For example, when the signal-to-noise ratio parameter of the multi-channel signal is the segmental signal-to-noise ratio, the first threshold may be 5000, 6000, 7000, or another empirical value, and the second threshold may be 2900000, 3000000, 3100000, or another empirical value. When the peak amplitude confidence parameter is the ratio of the difference between the amplitude value of the peak value of the cross correlation coefficients of the multi-channel signal and the amplitude value of the second largest value of the cross correlation coefficients of the multi-channel signal to the amplitude value of the peak value, the fifth threshold may be set to 0.3, 0.4, 0.5, or another empirical value. Further, the thresholds may be set depending on different parameter calculation methods, different requirements, different application scenarios, and the like.

It should be understood that there are many manners of reducing the quantity of target frames that are allowed to appear continuously. In some embodiments, a value used to indicate the quantity of target frames that are allowed to appear continuously may be preconfigured, and the objective of reducing the quantity of target frames that are allowed to appear continuously may be achieved by decreasing the value.

In some other embodiments, the target frame count and the threshold of the target frame count may be preconfigured. The target frame count may be used to indicate the quantity of target frames that have currently appeared continuously, and the threshold of the target frame count may be used to indicate the quantity of target frames that are allowed to appear continuously. Further, the quantity of target frames that are allowed to appear continuously is reduced by adjusting at least one of the target frame count and the threshold of the target frame count. For example, the quantity of target frames that are allowed to appear continuously may be reduced by increasing (or referred to as forcibly increasing) the target frame count. For another example, the quantity of target frames that are allowed to appear continuously may be reduced by decreasing the threshold of the target frame count. For another example, the quantity of target frames that are allowed to appear continuously may be reduced by increasing the target frame count and decreasing the threshold of the target frame count.

The foregoing describes a manner of controlling, based on the peak feature of the cross correlation coefficients of the multi-channel signal, the quantity of target frames that are allowed to appear continuously. In some embodiments, before the quantity of target frames that are allowed to appear continuously is controlled based on the peak feature of the cross correlation coefficients of the multi-channel signal, whether the signal-to-noise ratio parameter of the multi-channel signal meets a preset signal-to-noise ratio condition may be first determined.

If the signal-to-noise ratio parameter of the multi-channel signal does not meet the preset signal-to-noise ratio condition, the quantity of target frames that are allowed to appear continuously is controlled based on the peak feature of the cross correlation coefficients of the multi-channel signal, or if the signal-to-noise ratio of the multi-channel signal meets the signal-to-noise ratio condition, the ITD value of the previous frame of the current frame may directly stop being reused as the ITD value of the current frame.

Alternatively, if the signal-to-noise ratio parameter of the multi-channel signal meets the preset signal-to-noise ratio condition, the quantity of target frames that are allowed to appear continuously is controlled based on the peak feature of the cross correlation coefficients of the multi-channel signal, or if the signal-to-noise ratio of the multi-channel signal does not meet the signal-to-noise ratio condition, the ITD value of the previous frame of the current frame may directly stop being reused as the ITD value of the current frame.

The following describes in detail a manner of determining whether the signal-to-noise ratio of the multi-channel signal meets the signal-to-noise ratio condition, and how to stop reusing the ITD value of the previous frame of the current frame as the ITD value of the current frame.

First, the signal-to-noise ratio parameter of the multi-channel signal may be represented by one or more parameters. A specific manner of selecting a parameter is not limited in this embodiment of this application. For example, the signal-to-noise ratio parameter of the multi-channel signal may be represented by at least one of a subband signal-to-noise ratio, a modified subband signal-to-noise ratio, a segmental signal-to-noise ratio, a modified segmental signal-to-noise ratio, a full-band signal-to-noise ratio, a modified full-band signal-to-noise ratio, and another parameter that can represent a signal-to-noise ratio feature of the multi-channel signal.

Second, a manner of determining the signal-to-noise ratio parameter of the multi-channel signal is not limited in this embodiment of this application. For example, the signal-to-noise ratio parameter of the multi-channel signal may be calculated using the entire multi-channel signal. For another example, the signal-to-noise ratio parameter of the multi-channel signal may be calculated using some signals of the multi-channel signal, that is, the signal-to-noise ratio of the multi-channel signal is represented using signal-to-noise ratios of some signals. For another example, a signal of any channel may be adaptively selected from the multi-channel signal to perform calculation, that is, the signal-to-noise ratio of the multi-channel signal is represented using a signal-to-noise ratio of the signal of the channel. For another example, weighted averaging may be first performed on data representing the multi-channel signal, to form a new signal, and then the signal-to-noise ratio of the multi-channel signal is represented using a signal-to-noise ratio of the new signal.

The following describes, using an example in which the multi-channel signal includes a left-channel signal and a right-channel signal, a manner of calculating the signal-to-noise ratio of the multi-channel signal.

For example, time-frequency transformation may be first performed on a left-channel time-domain signal and a right-channel time-domain signal to obtain a left-channel frequency-domain signal and a right-channel frequency-domain signal, weighted averaging is performed on an amplitude spectrum of the left-channel frequency-domain signal and an amplitude spectrum of the right-channel frequency-domain signal to obtain an average amplitude spectrum of the left-channel frequency-domain signal and the right-channel frequency-domain signal, and then a modified segmental signal-to-noise ratio is calculated based on the average amplitude spectrum, and is used as a parameter representing the signal-to-noise ratio feature of the multi-channel signal.

For another example, time-frequency transformation may be first performed on a left-channel time-domain signal, to obtain a left-channel frequency-domain signal, and then a modified segmental signal-to-noise ratio of the left-channel frequency-domain signal is calculated based on an amplitude spectrum of the left-channel frequency-domain signal. Likewise, time-frequency transformation may be first performed on a right-channel time-domain signal to obtain a right-channel frequency-domain signal, and then a modified segmental signal-to-noise ratio of the right-channel frequency-domain signal is calculated based on an amplitude spectrum of the right-channel frequency-domain signal. Then an average value of modified segmental signal-to-noise ratios of the left-channel frequency-domain signal and the right-channel frequency-domain signal is calculated based on the modified segmental signal-to-noise ratio of the left-channel frequency-domain signal and the modified segmental signal-to-noise ratio of the right-channel frequency-domain signal, and is used as a parameter representing the signal-to-noise ratio feature of the multi-channel signal.

That when the signal-to-noise ratio of the multi-channel signal meets the signal-to-noise ratio condition, the ITD value of the previous frame of the current frame stops being reused as the ITD value of the current frame may include, when the value of the signal-to-noise ratio parameter of the multi-channel signal is greater than the preset threshold, stopping reusing the ITD value of the previous frame of the current frame as the ITD value of the current frame, for another example, when the value of the signal-to-noise ratio parameter of the multi-channel signal is within the preset value range, stopping reusing the ITD value of the previous frame of the current frame as the ITD value of the current frame, for another example, when the value of the signal-to-noise ratio parameter of the multi-channel signal is beyond the preset value range, stopping reusing the ITD value of the previous frame of the current frame as the ITD value of the current frame.

Further, in some embodiments, the stopping reusing the ITD value of the previous frame of the current frame may include increasing (or referred to as forcibly increasing) the target frame count such that a value of the target frame count is greater than or equal to the threshold of the target frame count. In some other embodiments, the stopping reusing the ITD value of the previous frame of the current frame as the ITD value of the current frame may include setting a stop flag bit such that some values of the stop flag bit represent stopping reusing the ITD value of the previous frame of the current frame as the ITD value of the current frame. For example, if the stop flag bit is set to 1, the ITD value of the previous frame of the current frame stops being reused as the ITD value of the current frame, or if the stop flag bit is set to 0, the ITD value of the previous frame of the current frame is allowed to be reused as the ITD value of the current frame.

With reference to specific examples, the following describes in detail a manner of stopping reusing the ITD value of the previous frame of the current frame as the ITD value of the current frame.

For example, when the value of the signal-to-noise ratio parameter of the multi-channel signal is less than a threshold, the value of the target frame count is forcibly modified such that a modified value is greater than or equal to the threshold of the target frame count.

For another example, when the value of the signal-to-noise ratio parameter of the multi-channel signal is greater than a threshold, the value of the target frame count is forcibly modified such that a modified value is greater than or equal to the threshold of the target frame count.

For another example, regardless of whether the value of the signal-to-noise ratio parameter of the multi-channel signal is less than a threshold or is greater than another threshold, the value of the target frame count is forcibly modified such that a modified value is greater than or equal to the threshold of the target frame count.

For another example, when the value of the signal-to-noise ratio parameter of the multi-channel signal is less than a threshold or is greater than another threshold, the stop flag bit is set to 1.

It should be noted that there may be a plurality of manners of determining the ITD value of the current frame in step 540. This is not limited in this embodiment of this application.

Optionally, in some embodiments, the ITD value of the current frame may be determined based on a comprehensive consideration of factors such as accuracy of the initial ITD value of the current frame and the quantity of target frames that are allowed to appear continuously (the quantity of target frames that are allowed to appear continuously may be a quantity obtained after control or adjustment is performed based on step 530).

Optionally, in some other embodiments, the ITD value of the current frame may be determined based on a comprehensive consideration of factors such as accuracy of the initial ITD value of the current frame, the quantity of target frames that are allowed to appear continuously (the quantity of target frames that are allowed to appear continuously may be a quantity obtained after adjustment is performed based on step 530), and whether the current frame is a continuous voice frame. For example, if a confidence level of the initial ITD value of the current frame is high, the initial ITD value of the current frame may be directly used as the ITD value of the current frame. For another example, when a confidence level of the initial ITD value of the current frame is low, and the current frame meets a condition for reusing the ITD value of the previous frame of the current frame, the ITD value of the previous frame of the current frame may be reused for the current frame.

It should be understood that there may be a plurality of manners of calculating the confidence level of the initial ITD value of the current frame. This is not limited in this embodiment of this application.

For example, if a value, of the cross correlation coefficient, that is corresponding to the initial ITD value and that is among values of the cross correlation coefficients of the multi-channel signal is greater than a preset threshold, it may be considered that the confidence level of the initial ITD value is high.

For another example, if a difference between a value, of the cross correlation coefficient, that is corresponding to the initial ITD value and that is among values of the cross correlation coefficients of the multi-channel signal, and a second largest value of the cross correlation coefficients of the multi-channel signal is greater than a preset threshold, it may be considered that the confidence level of the initial ITD value is high.

For another example, if the amplitude value of the peak value of the cross correlation coefficients of the multi-channel signal is greater than a preset threshold, it may be considered that the confidence level of the initial ITD value is high.

It should be understood that there may be a plurality of manners of determining whether the current frame meets the condition for reusing the ITD value of the previous frame of the current frame.

Optionally, in some embodiments, that the current frame meets the condition for reusing the ITD value of the previous frame of the current frame may be that the target frame count is less than the threshold of the target frame count.

Optionally, in some embodiments, that the current frame meets the condition for reusing the ITD value of the previous frame of the current frame may be that a voice activation detection result of the current frame indicates that the current frame and the previous N (N is a positive integer greater than 1) frames of the current frame form continuous voice frames. In this case, if the ITD value of the previous frame of the current frame is not equal to a first preset value (if an ITD value of a frame is the first preset value, it may be considered that the ITD value, obtained through calculation, of the frame is forcibly set to the first preset value due to inaccuracy, where the first preset value may be, for example, 0), the ITD value of the current frame is equal to the first preset value, and the target frame count is less than the threshold of the target frame count. For example, when both a voice activation detection result of the current frame and voice activation detection results of the previous N (N is a positive integer greater than 1) frames of the current frame indicate voice frames, if the ITD value of the previous frame of the current frame is not equal to 0, the ITD value of the current frame is forcibly set to 0, and the target frame count is less than the threshold of the target frame count. Then the ITD value of the previous frame of the current frame may be used as the ITD value of the current frame, and the value of the target frame count is increased. It should be noted that there may be a plurality of manners of forcibly setting the ITD value of the current frame to 0. For example, the ITD value of the current frame may be changed to 0, a flag bit may be set, to represent that the ITD value of the current frame has been forcibly set to 0, or the foregoing two manners may be combined.

Figure 6:
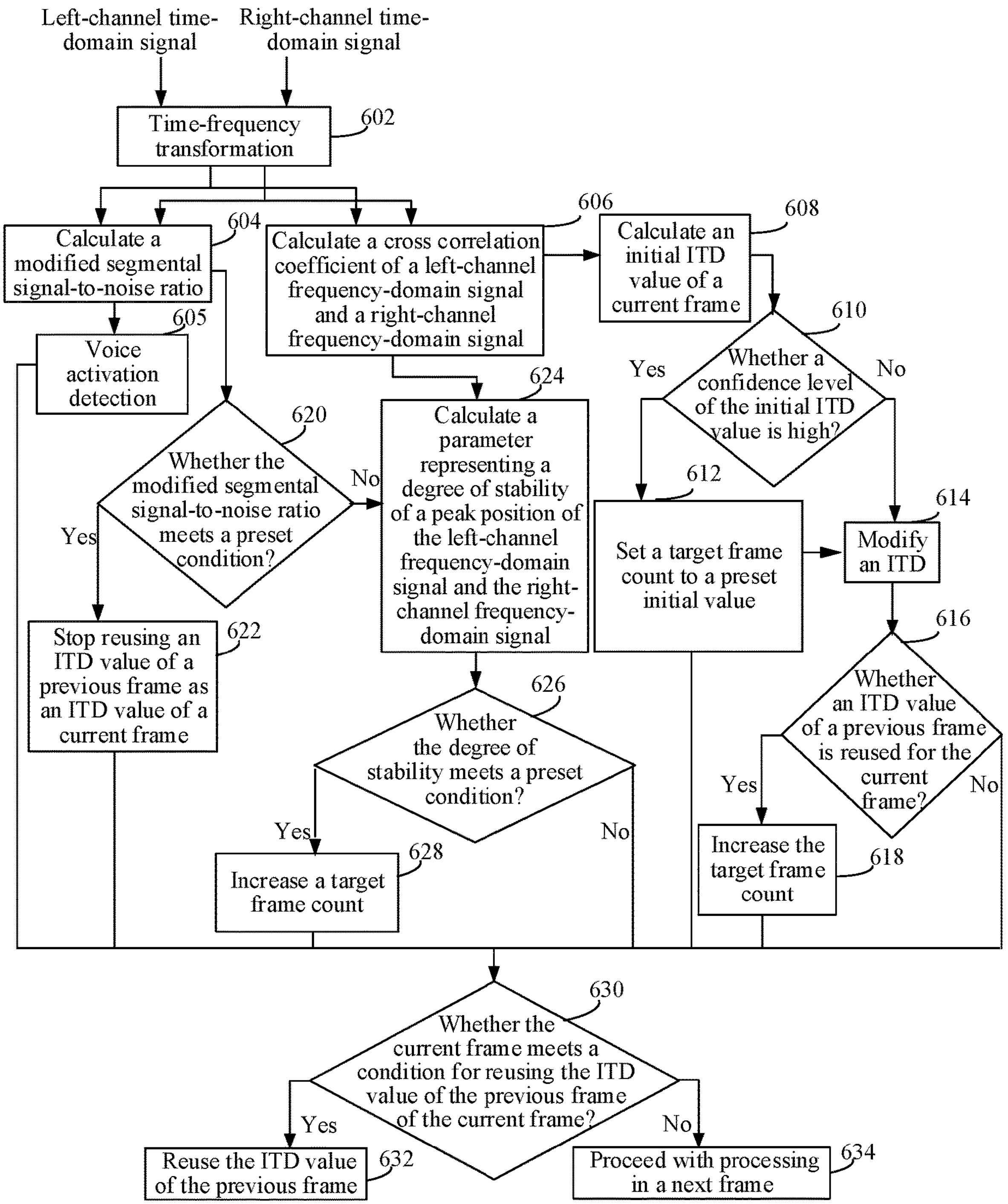
FIG. 6 is a schematic flowchart of a method for encoding a multi-channel signal according to an embodiment of this application.

The following describes the embodiments of this application in a more detailed manner with reference to specific examples. It should be noted that an example in FIG. 6 is merely intended to help a person skilled in the art understand the embodiments of this application, but not to limit the embodiments of this application to a specific value or a specific scenario in the example. Obviously, a person skilled in the art may perform various equivalent modifications or variations based on the example shown in FIG. 6, and such modifications or variations also fall within the scope of the embodiments of this application.

FIG. 6 is a schematic flowchart of a method for encoding a multi-channel signal according to an embodiment of this application. It should be understood that processing steps or operations shown in FIG. 6 are merely examples, and other operations, or variations of the operations in FIG. 6 may be further performed in this embodiment of this application. In addition, the steps in FIG. 6 may be performed in a sequence different from that shown in FIG. 6, and some operations in FIG. 6 may not need to be performed. FIG. 6 is described using an example in which a multi-channel signal includes a left-channel signal and a right-channel signal. It should be further understood that a parameter representing a degree of stability of a peak position of cross correlation coefficients of the multi-channel signal in the embodiment of FIG. 6 may be the peak amplitude confidence parameter and/or peak position fluctuation parameter described above.

The method in FIG. 6 includes the following steps.

Step 602: Perform time-frequency transformation on a left-channel time-domain signal and a right-channel time-domain signal.

A left-channel time-domain signal of an $m^{th}$ subframe of a current frame may be represented by $x^{m,left}$ (n), and a right-channel time-domain signal of the $m^{th}$ subframe may be represented by $x_{m,right}(n)$, where m=0, 1, . . . , SUBFR_NUM−1, SUBFR_NUM is a quantity of subframes included in an audio frame, n is an index value of a sample, n=0, 1, . . . , N−1, and N is a quantity of samples included in the left-channel time-domain signal or the right-channel time-domain signal of the $m^{th}$ subframe. In an example in which a multi-channel signal has a sampling rate of 16 KHz, and a length of an audio frame is 20 ms, a left-channel time-domain signal and a right-channel time-domain signal of the audio frame each include 320 samples. If the audio frame is divided into two subframes, and a left-channel time-domain signal and a right-channel time-domain signal of each subframe each include 160 samples, N is equal to 160.

Fast Fourier transformation based on L samples is separately performed on $x_{m,left}(n)$ and $x_{m,right}(n)$, to obtain a left-channel frequency-domain signal $X_{m,left}(k)$ of the $m^{th}$ subframe and a right-channel frequency-domain signal $X_{m,right}(k)$ of the $m^{th}$ subframe, where k=0, 1, . . . , L−1, and L is a fast Fourier transformation length, for example, L may be 400 or 800.

Step 604 and step 605: Calculate a modified segmental signal-to-noise ratio based on a left-channel frequency-domain signal and a right-channel frequency-domain signal, and perform voice activation detection based on the modified segmental signal-to-noise ratio.

Further, there are a plurality of manners of calculating the modified segmental signal-to-noise ratio based on $X_{m,left}(k)$ and $X_{m,right}(k)$. The following provides a specific calculation manner.

Step 1: Calculate an average amplitude spectrum $SPD_m(k)$ of the left-channel frequency-domain signal and the right-channel frequency-domain signal of the $m^{th}$ subframe based on $X_{m,left}(k)$ and $X_{m,right}(k)$.

For example, $SPD_m(k)$ may be calculated according to a formula (5):

$$SPD_m(k)=A*SPD_{m,left}(k)+(1-A)SPD_{m,right}(k), \tag{5}$$

where $$SPD_{m,left}(k)=(\mathrm{real}\{X_{m,left}(k)\})^2+(\mathrm{imag}\{X_{m,left}(k)\})^2,$$

and $$SPD_{m,right}(k)=(\mathrm{real}\{X_{m,right},(k)\})^2+(\mathrm{imag}\{X_{m,right}(k)\})^2,$$

where k=1, L/2−1, A is a preset left/right-channel amplitude spectrum mixing ratio factor, and A may be usually 0.5, 0.4, 0.3, or another empirical value.

Step 2: Calculate subband energy $E\_band_m(i)$ based on the average amplitude spectrum $SPD_m(k)$ of the left-channel frequency-domain signal and the right-channel frequency-domain signal of the $m^{th}$ subframe, where i=0, 1, . . . , BAND_NUM−1, and BAND_NUM is a quantity of subbands.

For example, E_band(i) may be calculated using a formula (6):

$$\mathrm{E\_band}(i)=\frac{1}{\mathrm{band\_rb}[i+1]-\mathrm{band\_rb}[i]}\sum_{k=band\_rb[i]}^{band\_rb[i+1]-1} SPD_m(k), \tag{6}$$

where band_rb is a preset table used for subband division, band_tb[i] is a lower-limit frequency bin of an $i^{th}$ subband, and band_tb[i+1]−1 is an upper-limit frequency bin of the $i^{th}$ subband.

Step 3: Calculate the modified segmental signal-to-noise ratio mssnr based on the subband energy E_band( ) and a subband noise energy estimate E_band_n(i).

For example, mssnr may be calculated using a formula (7) and a formula (8):

$$msnr(i)=\max\left(0, \frac{\mathrm{E\_band}\,(i)}{\mathrm{E\_band\_n}\,(i)}-1\right), \tag{7}$$

where if msnr(i)<G, msnr(i)=msnr(i)$^2$/G, $$mssnr=\sum_{i=0}^{BAND\_NUM-1} msnr(i), \tag{8}$$

where msnr(i) is a modified subband signal-to-noise ratio, G is a preset subband signal-to-noise ratio modification threshold, and G may be usually 5, 6, 7, or another empirical value. It should be understood that there are a plurality of methods for calculating the modified segmental signal-to-noise ratio, and this is merely an example herein.

Step 4: Update the subband noise energy estimate E_band_n (i) based on the modified segmental signal-to-noise ratio and the subband energy E_band(i).

Further, average subband energy may be first calculated according to a formula (9):

$$\text{energy} = \frac{1}{\text{BAND\_NUM}} \sum_{i=0}^{BAND\_NUM-1} \text{E\_band}(i). \quad (9)$$

If a VAD count vad_fm_cnt is less than a preset initial frame length of noise, the VAD count may be increased. The preset initial frame length of noise is usually a preset empirical value, for example, may be 29, 30, 31, or another empirical value.

If a VAD count vad_fm_cnt is less than a preset initial set frame length of noise, and the average subband energy is less than a noise energy threshold ener_th, the subband noise energy estimate E_band_n (i) may be updated, and a noise energy update flag is set to 1. The noise energy threshold is usually a preset empirical value, for example, may be 35000000, 40000000, 45000000, or another empirical value.

Further, the subband noise energy estimate may be updated using a formula (10):

$$\text{E\_band\_n}(i) = \frac{\text{E\_band\_n}_{n-1}(i) * \text{vad\_fm\_cnt} + \text{E\_band}(i)}{\text{vad\_fm\_cnt} + 1}, \quad (10)$$

where $\text{E\_band\_n}_{n-1}(i)$ is historical subband noise energy, for example, may be subband noise energy before the update.

Otherwise, if the modified segmental signal-to-noise ratio is less than a noise update threshold $th_{UPDATE}$, the subband noise energy estimate E_band_n(i) may also be updated, and a noise energy update flag is set to 1. The noise update threshold $th_{UPDATE}$ may be 4, 5, 6, or another empirical value.

Further, the subband noise energy estimate may be updated using a formula (11):

$$E\_band\_n(i) = (1 - \text{update\_fac}) E\_band\_n_{n-1}(i) + \text{update\_fac} * E\_band(i), \quad (11)$$

where update_fac is a specified noise update rate, and may be a constant value between 0 and 1, for example, may be 0.03, 0.04, 0.05, or another empirical value, and $\text{E\_band\_n}_{n-1}(i)$ is historical subband noise energy, for example, may be subband noise energy before the update.

In addition, to ensure effectiveness of calculation of the subband signal-to-noise ratio, a value of updated subband noise energy estimate may be limited, for example, a minimum value of E_band_n(i) may be limited to 1.

It should be noted that there are many methods for updating E_band_n(i) based on the modified segmental signal-to-noise ratio and E_band(i). This is not limited in this embodiment of this application, and this is merely an example herein.

Next, voice activation detection may be performed for the $m^{th}$ subframe based on the modified segmental signal-to-noise ratio. If the modified segmental signal-to-noise ratio is greater than a voice activation detection threshold $th_{VAD}$, the $m^{th}$ subframe is a voice frame, and in this case, a voice activation detection flag vad_flag[m] of the $m^{th}$ subframe is set to 1, otherwise, the m th subframe is a background noise frame, and in this case, a voice activation detection flag vad_flag[m] of the $m^{th}$ subframe may be set to 0. The voice activation detection threshold $th_{VAD}$ may be 3500, 4000, 4500, or another empirical value.

Step 606 to step 608: Calculate a cross correlation coefficient of the left-channel frequency-domain signal and the right-channel frequency-domain signal based on the left-channel frequency-domain signal and the right-channel frequency-domain signal, and calculate an initial ITD value of a current frame based on the cross correlation coefficient of the left-channel frequency-domain signal and the right-channel frequency-domain signal.

There may be a plurality of manners of calculating the cross correlation coefficient Xcorr(t) of the left-channel frequency-domain signal and the right-channel frequency-domain signal based on $X_{m,left}(k)$ and $X_{m,right}(k)$. The following provides a specific implementation.

First, a cross correlation power spectrum $Xcorr_m(k)$ of the left-channel frequency-domain signal and the right-channel frequency-domain signal of the $m^{th}$ subframe is calculated according to a formula (12):

$$Xcorr_m(k) = X_{m,left}(k) * X_{m,right}^*(k). \quad (12)$$

Then, smoothing processing is performed on the cross correlation power spectrum of the left-channel frequency-domain signal and the right-channel frequency-domain signal according to a formula (13), to obtain a smoothed cross correlation power spectrum Xcorr_smooth(k):

$$Xcorr\_smooth(k) = \text{smooth\_fac} * Xcorr\_smooth(k) + (1 - \text{smooth\_fac}) * Xcorr_m(k), \quad (13)$$

where smooth_fac is a smoothing factor, and the smoothing factor may be any positive number between 0 and 1, for example, may be 0.4, 0.5, 0.6, or another empirical value.

Next, Xcorr(t) may be calculated based on Xcorr_smooth (k) and using a formula (14):

$$X\text{corr}(t) = IDFT\left(\frac{X\text{corr\_smooth}(k)}{|X\text{corr\_smooth}(k)|}\right), \quad (14)$$

where IDFT(*) indicates inverse Fourier transformation, a value range of an ITD value included in the calculation may be [−ITD_MAX, ITD_MAX], and interception and reordering are performed on Xcorr(t) based on the value range of the ITD value, to obtain a cross correlation coefficient Xcorr_itd(t), used to determine the initial ITD value of the current frame, of the left-channel frequency-domain signal and the right-channel frequency-domain signal, and in this case, t=0, . . . , 2*ITD_MAX.

Then the initial ITD value of the current frame may be estimated based on Xcorr_itd(t) and using a formula (15):

$$ITD = \text{argmax}(Xcorr\_itd(t)) - ITD\_MAX. \quad (15)$$

Step 610 to step 612: Determine a confidence level of the initial ITD value of the current frame. If the confidence level of the initial ITD value is high, a target frame count may be set to a preset initial value.

Further, the confidence level of the initial ITD value of the current frame may be first determined. There may be a plurality of specific determining manners. The following provides descriptions using examples.

For example, an amplitude value, of the cross correlation coefficient, that is corresponding to the initial ITD value and that is among amplitude values of the cross correlation coefficient of the left-channel frequency-domain signal and the right-channel frequency-domain signal may be compared with a preset threshold. If the amplitude value is greater than the preset threshold, it may be considered that the confidence level of the initial ITD value of the current frame is high.

For another example, values of the cross correlation coefficient of the left-channel frequency-domain signal and the right-channel frequency-domain signal may be first sorted in descending order of amplitude values. Then a target cross correlation coefficient at a preset location (the location may be represented using an index value of the cross correlation coefficient) may be selected from sorted values of the cross correlation coefficient. Next, an amplitude value, of the cross correlation coefficient, that is corresponding to the initial ITD value and that is among amplitude values of the cross correlation coefficient of the left-channel frequency-domain signal and the right-channel frequency-domain signal is compared with an amplitude value of the target cross correlation coefficient. If a difference between the amplitude values is greater than a preset threshold, it may be considered that the confidence level of the initial ITD value of the current frame is high, if a ratio between the amplitude values is greater than a preset threshold, it may be considered that the confidence level of the initial ITD value of the current frame is high, or if the amplitude value, of the cross correlation coefficient, that is corresponding to the initial ITD value and that is among amplitude values of the cross correlation coefficient of the left-channel frequency-domain signal and the right-channel frequency-domain signal is greater than the amplitude value of the target cross correlation coefficient, it may be considered that the confidence level of the initial ITD value of the current frame is high.

In addition, after the target cross correlation coefficient is obtained, first, the target cross correlation coefficient may be further modified. Next, the amplitude value, of the cross correlation coefficient, that is corresponding to the initial ITD value and that is among amplitude values of the cross correlation coefficient of the left-channel frequency-domain signal and the right-channel frequency-domain signal is compared with an amplitude value of a modified target cross correlation coefficient. If the amplitude value, of the cross correlation coefficient, that is corresponding to the initial ITD value and that is among amplitude values of the cross correlation coefficient of the left-channel frequency-domain signal and the right-channel frequency-domain signal is greater than the amplitude value of the modified target cross correlation coefficient, it may be considered that the confidence level of the initial ITD value of the current frame is high.

If the confidence level of the initial ITD value of the current frame is high, the initial ITD value may be used as an ITD value of the current frame. Further, a flag bit itd_cal_flag indicating accurate ITD value calculation may be preset. If the confidence level of the initial ITD value of the current frame is high, itd_cal_flag may be set to 1, or if the confidence level of the initial ITD value of the current frame is low, itd_cal_flag may be set to 0.

Further, if the confidence level of the initial ITD value of the current frame is high, the target frame count may be set to the preset initial value, for example, the target frame count may be set to 0 or 1.

Step 614: If the confidence level of the initial ITD value is low, ITD value modification may be performed on the initial ITD value. There may be many manners of modifying an ITD value. For example, hangover processing may be performed on the ITD value, or the ITD value may be modified based on correlation of two adjacent frames. This is not limited in this embodiment of this application.

Step 616 to 618: Determine whether an ITD value of a previous frame is reused for the current frame, and if the ITD value of the previous frame is reused for the current frame, increase a value of a target frame count.

Step 620 to 622: Determine whether the modified segmental signal-to-noise ratio meets a preset signal-to-noise ratio condition, and if the modified segmental signal-to-noise ratio meets the preset signal-to-noise ratio condition, stop reusing an ITD value of a previous frame as an ITD value of a current frame. For example, a value of a target frame count may be modified such that a modified target frame count is greater than or equal to a threshold of the target frame count (the threshold may indicate a quantity of target frames that are allowed to appear continuously) in order to stop reusing the ITD value of the previous frame of the current frame as the ITD value of the current frame.

There may be a plurality of manners of determining whether the modified segmental signal-to-noise ratio meets the preset signal-to-noise ratio condition. Optionally, in some embodiments, when the modified segmental signal-to-noise ratio is less than a first threshold or is greater than a second threshold, it may be considered that the modified segmental signal-to-noise ratio meets the preset signal-to-noise ratio condition. In this case, the value of the target frame count may be modified such that a modified target frame count is greater than or equal to the threshold of the target frame count.

For example, assuming that a high signal-to-noise ratio voice threshold HIGH_SNR_VOICE_TH is preset to 10000, the first threshold may be set to $A_1$*HIGH_SNR_VOICE_TH, and the second threshold is set to $A_2$*HIGH_SNR_VOICE_TH, where $A_1$ and $A_2$ are positive real numbers, and $A_1<A_2$. Herein, $A_1$ may be 0.5, 0.6, 0.7, or another empirical value, and $A_2$ may be 290, 300, 310, or another empirical value. The threshold of the target frame count may be equal to 9, 10, 11, or another empirical value.

Step 624: If the modified segmental signal-to-noise ratio does not meet the preset signal-to-noise ratio condition, calculate a parameter representing a degree of stability of a peak position of the cross correlation coefficient of the left-channel frequency-domain signal and the right-channel frequency-domain signal.

Further, if the modified segmental signal-to-noise ratio is greater than or equal to a first threshold and less than or equal to a second threshold, it may be considered that the modified segmental signal-to-noise ratio does not meet the preset signal-to-noise ratio condition. In this case, the parameter representing the degree of stability of the peak position of the cross correlation coefficient of the left-channel frequency-domain signal and the right-channel frequency-domain signal is calculated.

In this embodiment, the parameter representing the degree of stability of the peak position of the cross correlation coefficient of the left-channel frequency-domain signal and the right-channel frequency-domain signal may be a group of parameters. The group of parameters may include a peak amplitude confidence parameter peak_mag_prob and a peak position fluctuation parameter peak_pos_fluc of the cross correlation coefficient.

Further, peak_mag_prob may be calculated in the following manner.

First, values of the cross correlation coefficient Xcorr_itd (t) of the left-channel frequency-domain signal and the right-channel frequency-domain signal are sorted in descending or ascending order of amplitude values, and peak_mag_prob is calculated based on sorted values of the cross correlation coefficient Xcorr_itd (t) of the left-channel frequency-domain signal and the right-channel frequency-domain signal using a formula (16):

$$peak\_mag\_prob = \frac{X\,corr\_itd(X) - X\,corr\_itd\,(Y)}{Xcorr\_itd\,(X)}, \tag{16}$$

where X represents an index of a peak position of the sorted values of the cross correlation coefficient of the left-channel frequency-domain signal and the right-channel frequency-domain signal, and Y represents an index of a preset location of the sorted values of the cross correlation coefficient of the left-channel frequency-domain signal and the right-channel frequency-domain signal. For example, the values of the cross correlation coefficient Xcorr_itd (t) of the left-channel frequency-domain signal and the right-channel frequency-domain signal are sorted in ascending order of the amplitude values, a location of X is 2*ITD_MAX, and a location of Y may be 2*ITD_MAX−1. In this case, in this embodiment of this application, a ratio of a difference between an amplitude value of a peak value of the cross correlation coefficient of the left-channel frequency-domain signal and the right-channel frequency-domain signal, and an amplitude value of a second largest value of the cross correlation coefficient of the left-channel frequency-domain signal and the right-channel frequency-domain signal to the amplitude value of the peak value is used as the peak amplitude confidence parameter, namely, peak_mag_prob, of the cross correlation coefficient. Certainly, this is merely one manner of selecting peak_mag_prob.

Further, there may also be a plurality of manners of calculating peak_pos_fluc. Optionally, in some embodiments, peak_pos_fluc may be obtained through calculation based on an ITD value corresponding to an index of the peak position of the cross correlation coefficient of the left-channel frequency-domain signal and the right-channel frequency-domain signal and an ITD value of previous N frames of the current frame, where N is an integer greater than or equal to 1. Optionally, in some embodiments, peak_pos_fluc may be obtained through calculation based on an index of the peak position of the cross correlation coefficient of the left-channel frequency-domain signal and the right-channel frequency-domain signal and an index of a peak position of a cross correlation coefficient of a left-channel frequency-domain signal and a right-channel frequency-domain signal of previous N frames of the current frame, where N is an integer greater than or equal to 1.

For example, referring to a formula (17), peak_pos_fluc may be an absolute value of a difference between the ITD value corresponding to the index of the peak position of the cross correlation coefficient of the left-channel frequency-domain signal and the right-channel frequency-domain signal and the ITD value of the previous frame of the current frame:

$$peak\_pos\_fluc = abs(argmax(Xcorr(t)) - ITD\_MAX - prev\_itd), \tag{17}$$

where prev_itd represents the ITD value of the previous frame of the current frame, abs(*) represents an operation of obtaining the absolute value, and argmax represents an operation of searching a location of a maximum value.

Step 626 to step 628: Determine whether the degree of stability of the peak position of the cross correlation coefficient of the left-channel frequency-domain signal and the right-channel frequency-domain signal meets a preset condition, and if the degree of stability meets the preset condition, increase a target frame count.

That is, when the degree of stability of the peak position of the cross correlation coefficient of the left-channel frequency-domain signal and the right-channel frequency-domain signal meets the preset condition, a quantity of target frames that are allowed to appear continuously is reduced.

For example, if peak_mag_prob is greater than a peak amplitude confidence threshold $th_{prob}$, and peak_pos_fluc is greater than a peak position fluctuation threshold $th_{fluc}$, the target frame count is increased. In this embodiment of this application, the peak amplitude confidence threshold $th_{prob}$ may be set to 0.1, 0.2, 0.3, or another empirical value, and the peak position fluctuation threshold $th_{fluc}$ may be set to 4, 5, 6, or another empirical value.

It should be understood that there may be a plurality of manners of increasing the target frame count.

Optionally, in some embodiments, the target frame count may be directly increased by 1.

Optionally, in some embodiments, an increase amount of the target frame count may be controlled based on the modified segmental signal-to-noise ratio and/or one or more of a group of parameters representing a degree of stability of a peak position of a cross correlation coefficient between different channels.

For example, if $R_1$ mssnr<$R_2$, the target frame count is increased by 1, if $R_2 \le mssnr < R_3$, the target frame count is increased by 2, or if $R_3 \le mssnr \le R_4$, the target frame count is increased by 3, where $R_1 < R_2 < R_3 < R_4$.

For another example, if $U_1 < peak\_mag\_prob < U_2$ and $peak\_pos\_fluc > th_{fluc}$, the target frame count is increased by 1, if $U_2 < peak\_mag\_prob < U_3$ and $peak\_pos\_fluc > th_{fluc}$, the target frame count is increased by 2, or if $U_3 \le peak\_mag\_prob$ and $peak\_pos\_fluc > th_{fluc}$, the target frame count is increased by 3. Herein, $U_1$ may be the peak amplitude confidence threshold $th_{prob}$, and $U_1 < U_2 < U_3$.

Step 630 to step 634: Determine whether the current frame meets a condition for reusing the ITD value of the previous frame of the current frame, and if the current frame meets the condition, use the ITD value of the previous frame of the current frame as the ITD value of the current frame, and increase the target frame count, or otherwise, skip reusing the ITD value of the previous frame of the current frame as the ITD value of the current frame, and perform processing in a next frame.

It should be noted that whether the current frame meets the condition for reusing the ITD value of the previous frame of the current frame is not limited in this embodiment of this application. The condition may be set based on one or more of factors such as accuracy of the initial ITD value, whether the target frame count reaches the threshold, and whether the current frame is a continuous voice frame.

For example, if both a voice activation detection result of the $m^{th}$ subframe of the current frame and a voice activation detection result of the previous frame indicate voice frames, provided that the ITD value of the previous frame is not equal to 0, when the initial ITD value of the current frame is equal to 0, the confidence level of the initial ITD value of the current frame is low (the confidence level of the initial ITD value may be identified using a value of itd_cal_flag, for example, if itd_cal_flag is not equal to 1, the confidence level of the initial ITD value is low, and for details, refer to descriptions of step 612), and the target frame count is less than the threshold of the target frame count, the ITD value of the previous frame of the current frame may be used as the ITD value of the current frame, and the target frame count is increased.

Further, if both a voice activation detection result of the current frame and a voice activation detection result of an $m^{th}$ subframe of the previous frame of the current frame indicate voice frames, a voice activation detection result flag bit pre_vad of the previous frame may be updated to a voice frame flag, that is, pre_vad is equal to 1, otherwise, a voice activation detection result pre_vad of the previous frame is updated to a background noise frame flag, that is, pre_vad is equal to 0.

The foregoing describes in detail a manner of calculating the modified segmental signal-to-noise ratio with reference to step 604. However, this embodiment of this application is not limited thereto. The following provides another implementation of the modified segmental signal-to-noise ratio.

Optionally, in some embodiments, the modified segmental signal-to-noise ratio may be calculated in the following manner.

Step 1: Calculate an average amplitude spectrum $SPD_{m,left}(k)$ of the left-channel frequency-domain signal of the $m^{th}$ subframe and an average amplitude spectrum $SPD_{m,right}(k)$ of the right-channel frequency-domain signal of the $m^{th}$ subframe based on the left-channel frequency-domain signal $X_{m,left}(k)$ of the $m^{th}$ subframe and the right-channel frequency-domain signal $X_{m,right}(k)$ of the $m^{th}$ subframe using formulas (18) and (19):

$$SPD_{m,left}(k)=(\mathrm{real}\{X_{m,left}(k)\})^2+(\mathrm{imag}\{X_{m,left}(k)\})^2, \tag{18}$$

$$SPD_{m,right}(k)=(\mathrm{real}\{X_{m,right}(k)\})^2+(\mathrm{imag}\{X_{m,right}(k)\})^2, \tag{19}$$

where k=1, . . . , L/2−1, and L is a fast Fourier transformation length, for example, L may be 400 or 800.

Step 2: Calculate average amplitude spectrums $SPD_{left}(k)$ and $SPD_{right}(k)$ of a left-channel frequency-domain signal and a right-channel frequency-domain signal of the current frame based on $SPD_{m,left}(k)$ and $SPD_{m,right}(k)$ using formulas (20) and (21):

$$SPD_{left}(k)=\frac{1}{\mathrm{SUBFR\_NUM}}\sum_{m=0}^{SUBFR\_NUM-1} SPD_{m,left}(k), \tag{20a}$$

$$SPD_{right}(k)=\frac{1}{\mathrm{SUBFR\_NUM}}\sum_{m=0}^{SUBFR\_NUM-1} SPD_{m,right}(k). \tag{21a}$$

Alternatively, the formulas may be:

$$SPD_{left}(k)=\sum_{m=0}^{SUBFR\_NUM-1} SPD_{m,left}(k), \tag{20b}$$

$$SPD_{right}(k)=\sum_{m=0}^{SUBFR\_NUM-1} SPD_{m,right}(k), \tag{21b}$$

where SUBFR_NUM represents a quantity of subframes included in an audio frame.

Step 3: Calculate an average amplitude spectrum SPD(k) of the left-channel frequency-domain signal and the right-channel frequency-domain signal of the current frame based on $SPD_{left}(k)$ and $SPD_{right}(k)$ using a formula (22):

$$SPD(k)=A*SPD_{left}(k)+(1-A)SPD_{right}(k), \tag{22}$$

where A is a preset left/right-channel amplitude spectrum mixing ratio factor, and A may be 0.4, 0.5, 0.6, or another empirical value.

Step 4: Calculate subband energy E_band(i) based on SPD(k) using a formula (23), where i=0, 1, . . . , BAND_NUM−1, and BAND_NUM represents a quantity of subbands:

$$\mathrm{E\_band}(i)=\frac{1}{\mathrm{band\_rb}[i+1]-\mathrm{band\_rb}[i]}\sum_{k=band\_rb[i]}^{band\_rb[i+1]-1} SPD(k), \tag{23}$$

where band_rb represents a preset table used for subband division, band_tb[i] represents a lower-limit frequency bin of an $i^{th}$ subband, and band_tb[i+1]−1 represents an upper-limit frequency bin of the $i^{th}$ subband.

Step 5: Calculate the modified segmental signal-to-noise ratio mssnr based on E_band(i) and a subband noise energy estimate E_band_n(i). Further, mssnr may be calculated using the implementation described in the formula (7) and the formula (8). Details are not described herein again.

Step 6: Update E_band_n(i) based on E_band(i). Further, E_band_n(i) may be updated using the implementation described in the formula (9) to the formula (11). Details are not described herein again.

Optionally, in some other embodiments, the modified segmental signal-to-noise ratio may be calculated in the following manner.

Step 1: Calculate an average amplitude spectrum $SPD_{m,left}(k)$ of the left-channel frequency-domain signal of the $m^{th}$ subframe and an average amplitude spectrum $SPD_{m,right}(k)$ of the right-channel frequency-domain signal of the $m^{th}$ subframe based on the left-channel frequency-domain signal $X_{m,left}(k)$ of the $m^{th}$ subframe and the right-channel frequency-domain signal $X_{m,right}(k)$ of the $m^{th}$ subframe using formulas (24) and (25):

$$SPD_{m,left}(k)=(\mathrm{real}\{X_{m,left}(k)\})^2+(\mathrm{imag}\{X_{m,left}(k)\})^2, \tag{24}$$

$$SPD_{m,right}(k)=(\mathrm{real}\{X_{m,right}(k)\})^2+(\mathrm{imag}\{X_{m,right}(k)\})^2, \tag{25}$$

where k=1, . . . , L/2−1, and L is a fast Fourier transformation length, for example, L may be 400 or 800.

Step 2: Calculate an average amplitude spectrum $SPD_m(k)$ of the left-channel frequency-domain signal and the right-channel frequency-domain signal of the $m^{th}$ subframe based on $SPD_{m,left}(k)$ and $SPD_{m,right}(k)$ using a formula (26):

$$SPD_m(k)=A*SPD_{m,left}(k)+(1-A)SPD_{m,right}(k), \tag{26}$$

where A is a preset left/right-channel amplitude spectrum mixing ratio factor, and A may be 0.4, 0.5, 0.6, or another empirical value.

Step 3: Calculate an average amplitude spectrum SPD(k) of a left-channel frequency-domain signal and a right-channel frequency-domain signal of the current frame based on $SPD_m(k)$ using a formula (27).

An optional calculation manner is as follows:

$$SPD(k)=\frac{1}{\mathrm{SUBFR\_NUM}}\sum_{m=0}^{SUBFR\_NUM-1} SPD_m(k) \tag{27a}$$

Another optional calculation manner is as follows:

$$SPD(k)=\sum_{m=0}^{SUBFR\_NUM-1} SPD_m(k) \tag{27b}$$

Step 4: Calculate subband energy E_band(i) based on SPD(k) using a formula (28), where i=0, 1, . . . , BAND_NUM−1, and BAND_NUM is a quantity of subbands:

$$E\_band_m(i) = \frac{1}{band\_rb[i+1] - band\_rb[i]} \sum_{k=band\_rb[i]}^{band\_rb[i+1]-1} SPD_m(k), \tag{28}$$

where band_rb represents a preset table used for subband division, band_tb[i] represents a lower-limit frequency bin of an $i^{th}$ subband, and band_tb[i+1]−1 represents an upper-limit frequency bin of the $i^{th}$ subband.

Step 5: Calculate the modified segmental signal-to-noise ratio mssnr based on $E\_band_m(i)$ and a subband noise energy estimate E_band(i). Further, mssnr may be calculated using the implementation described in the formula (7) and the formula (8). Details are not described herein again.

Step 6: Update E_band_n(i) based on E_band(i). Further, E_band_n(i) may be updated using the implementation described in the formula (9) to the formula (11). Details are not described herein again.

Optionally, in some other embodiments, the modified segmental signal-to-noise ratio may be calculated in the following manner.

Step 1: Calculate an average amplitude spectrum $SPD_m(k)$ of the left-channel frequency-domain signal and the right-channel frequency-domain signal of the $m^{th}$ subframe based on the left-channel frequency-domain signal $X_{m,left}(k)$ of the $m^{th}$ subframe and the right-channel frequency-domain signal $X_{m,right}(k)$ of the $m^{th}$ subframe using a formula (29):

$$SPD_m(k)=A*SPD_{m,left}(k)+(1-A)SPD_{m,right}(k), \tag{29}$$

where $$SPD_{m,left}(k)=(\mathrm{real}\{X_{m,left}(k)\})^2+(\mathrm{image}\{X_{m,left}(k)\})^2,$$

and $$SPD_{m,right}(k)=(\mathrm{real}\{X_{m,right}(k)\})^2+(\mathrm{imag}\{X_{m,right}(k)\})^2,$$

where k=1, L/2−1, L is a fast Fourier transformation length, for example, L may be 400 or 800, and A is a preset left/right-channel amplitude spectrum mixing ratio factor, and A may be 0.4, 0.6, or another empirical value.

Step 2: Calculate subband energy $E\_band_m(i)$ of the $m^{th}$ subframe based on $SPD_m(k)$ using a formula (30), where i=0, 1, . . . , BAND_NUM−1, and BAND_NUM is a quantity of subbands:

$$E\_band_m(i) = \frac{1}{band\_rb[i+1] - band\_rb[i]} \sum_{k=band\_rb[i]}^{band\_rb[i+1]-1} SPD_m(k), \tag{30}$$

where band_rb represents a preset table used for subband division, band_tb[i] represents a lower-limit frequency bin of an $i^{th}$ subband, and band_tb[i+1]−1 represents an upper-limit frequency bin of the $i^{th}$ subband.

Step 3: Calculate subband energy E_band(i) of the current frame based on the subband energy $E\_band_m(i)$ of the $m^{th}$ subframe using a formula (31):

$$E\_band(i) = \frac{1}{SUBFR\_NUM} \sum_{m=0}^{SUBFR\_NUM-1} E\_band_m(i). \tag{31a}$$

Alternatively, the formula may be:

$$E\_band(i) = \sum_{m=0}^{SUBFR\_NUM-1} E\_band_m(i). \tag{31b}$$

Step 4: Calculate the modified segmental signal-to-noise ratio mssnr based on E_band(i) and a subband noise energy estimate E_band_n(i). Further, mssnr may be calculated using the implementation described in the formula (7) and the formula (8). Details are not described herein again.

Step 5: Update E_band_n (i) based on E_band(i). Further, E_band_n (i) may be updated using the implementation described in the formula (9) to the formula (11). Details are not described herein again.

The foregoing describes in detail an implementation of voice activation detection with reference to step 605. However, this embodiment of this application is not limited thereto. The following provides another implementation of voice activation detection.

Further, if the modified segmental signal-to-noise ratio is greater than a voice activation detection threshold $th_{VAD}$, the current subframe is a voice frame, and a voice activation detection flag vad_flag of the current frame is set to 1, otherwise, the current frame is a background noise frame, and a voice activation detection flag vad_flag of the current frame is set to 0. The voice activation detection threshold $th_{VAD}$ is usually an empirical value, and herein may be 3500, 4000, 4500, or the like.

Correspondingly, the implementation of steps 630 to 634 may be modified to the following implementation.

When both a voice activation detection result of the current frame and a voice activation detection result pre_vad of the previous frame indicate voice frames, if the ITD value of the previous frame is not equal to 0, the initial ITD value of the current frame is equal to 0, the confidence level of the initial ITD value of the current frame is low (the confidence level of the initial ITD value may be identified using a value of itd_cal_flag, for example, if itd_cal_flag is not equal to 1, the confidence level of the initial ITD value is low, and for details, refer to descriptions of step 612), and the target frame count is less than the threshold of the target frame count, the ITD value of the previous frame is used as the ITD value of the current frame, and the target frame count is increased.

If a voice activation detection result of the current frame indicates a voice frame, a voice activation detection result pre_vad of the previous frame is updated to a voice frame flag, that is, pre_vad is equal to 1, otherwise, a voice activation detection result pre_vad of the previous frame is updated to a background noise frame flag, that is, pre_vad is equal to 0.

With reference to steps 626 to 628, the foregoing describes in detail a manner of adjusting or controlling the quantity of target frames that are allowed to appear continuously. However, this embodiment of this application is not limited thereto. The following provides another manner of adjusting or controlling the quantity of target frames that are allowed to appear continuously.

Optionally, in some embodiments, first, it is determined whether the degree of stability of the peak position of the cross correlation coefficient of the left-channel frequency-domain signal and the right-channel frequency-domain signal meets a preset condition, and if the degree of stability meets the preset condition, the threshold of the target frame count is decreased. That is, in this embodiment of this application, the quantity of target frames that are allowed to appear continuously is reduced by decreasing the threshold of the target frame count.

It should be noted that there may be a plurality of manners of determining whether the degree of stability of the peak position of the cross correlation coefficient of the left-channel frequency-domain signal and the right-channel frequency-domain signal meets the preset condition. This is not limited in this embodiment of this application. For example, the preset condition may be that the peak amplitude confidence parameter of the cross correlation coefficient of the left-channel frequency-domain signal and the right-channel frequency-domain signal is greater than a preset peak amplitude confidence threshold, and the peak position fluctuation parameter is greater than a preset peak position fluctuation threshold, where the peak amplitude confidence threshold may be 0.1, 0.2, 0.3, or another empirical value, and the peak position fluctuation threshold may be 4, 5, 6, or another empirical value.

It should be noted that there may be a plurality of manners of decreasing the threshold of the target frame count. This is not limited in this embodiment of this application.

Optionally, in some embodiments, the threshold of the target frame count may be directly decreased by 1.

Optionally, in some other embodiments, a decrease amount of the threshold of the target frame count may be controlled based on the modified segmental signal-to-noise ratio and one or more of the group of parameters representing the degree of stability of the peak position of the cross correlation coefficient of the left-channel frequency-domain signal and the right-channel frequency-domain signal.

For example, if $R_1 \le mssnr < R_2$, the threshold of the target frame count may be decreased by 1, if $R_2 \le mssnr < R_3$, the threshold of the target frame count may be decreased by 2, or if $R_3 \le mssnr \le R_4$, the threshold of the target frame count may be decreased by 3, where $R_1$, $R_2$, $R_3$, and $R_4$ meet $R_1 < R_2 < R_3 < R_4$.

For another example, if $U_1 <$ peak_mag_prob $< U_2$ and peak_pos_fluc $> th_{fluc}$, the threshold of the target frame count may be decreased by 1, if $U_2 <$ peak_mag_prob $< U_3$ and peak_pos_fluc $> th_{fluc}$, the threshold of the target frame count may be decreased by 2, or if $U_3 \le$ peak_mag_prob and peak_pos_fluc $> th_{fluc}$, the threshold of the target frame count may be decreased by 3, where $U_1$, $U_2$, and $U_3$ may meet $U_1 < U_2 < U_3$, and $U_1$ may be the peak amplitude confidence threshold $th_{prob}$ described above.

With reference to step 624, the foregoing describes in detail a manner of calculating the parameter representing the degree of stability of the peak position of the cross correlation coefficient of the left-channel frequency-domain signal and the right-channel frequency-domain signal. In step 624, the parameter representing the degree of stability of the peak position of the cross correlation coefficient of the left-channel frequency-domain signal and the right-channel frequency-domain signal mainly includes two parameters, the peak amplitude confidence parameter peak_mag_prob and the peak position fluctuation parameter peak_pos_fluc. However, this embodiment of this application is not limited thereto.

Optionally, in some embodiments, the parameter representing the degree of stability of the peak position of the cross correlation coefficient of the left-channel frequency-domain signal and the right-channel frequency-domain signal may include only peak_pos_fluc. Correspondingly, step 626 may be modified to, if peak_pos_fluc is greater than the peak position fluctuation threshold $th_{fluc}$, increase the target frame count.

Optionally, in some other embodiments, a parameter representing a degree of stability of a peak position of a cross correlation coefficient between different channels may be a peak position stability parameter peak_stable obtained after a linear and/or a nonlinear operation is performed on peak_mag_prob and peak_pos_fluc.

For example, a relationship between peak_stable, peak_mag_prob, and peak_pos_fluc may be represented using a formula (32):

$$peak\_stable = peak\_mag\_prob/(peak\_pos\_fluc)^P. \quad (32)$$

For another example, a relationship between peak_stable, peak_mag_prob, and peak_pos_fluc may be represented using a formula (33):

$$peak\_stable = diff\_factor[peak\_pos\_fluc] * peak\_mag\_prob, \quad (33)$$

where diff_factor represents a preset difference factor sequence of ITD values of adjacent frames, diff_factor may include difference factors that are of ITD values of adjacent frames and that correspond to all possible values of peak_pos_fluc, diff_factor may be set based on experience, or may be obtained through training based on massive data, and P may represent a peak position fluctuation impact exponent of the cross correlation coefficient of the left-channel frequency-domain signal and the right-channel frequency-domain signal, and P may be a positive integer greater than or equal to 1, for example, P may be 1, 2, 3, or another empirical value.

Correspondingly, step 626 may be modified to, if peak_stable is greater than a preset peak position stability threshold, increase the target frame count. Herein, the preset peak position stability threshold may be a positive real number greater than or equal to 0, or may be another empirical value.

Further, in some embodiments, smoothing processing may be performed on peak_stable, to obtain a smoothed peak position stability parameter lt_peak_stable, and subsequent determining is performed based on lt_peak_stable.

Further, lt_peak_stable may be calculated using a formula (34):

$$lt\_peak\_stable = (1 - alpha) * lt\_peak\_stable + alpha * peak\_stable, \quad (34)$$

where alpha represents a long-term smoothing factor, and may be usually a positive real number greater than or equal to 0 and less than or equal to 1, for example, alpha may be 0.4, 0.5, 0.6, or another empirical value.

Correspondingly, step 626 may be modified to If lt_peak_stable is greater than a preset peak position stability threshold, increase the target frame count. Herein, the preset peak position stability threshold may be a positive real number greater than or equal to 0, or may be another empirical value.

The following describes apparatus embodiments of this application. The apparatus embodiments may be used to perform the foregoing methods. Therefore, for a part not described in detail, refer to the foregoing method embodiments.

Figure 7:
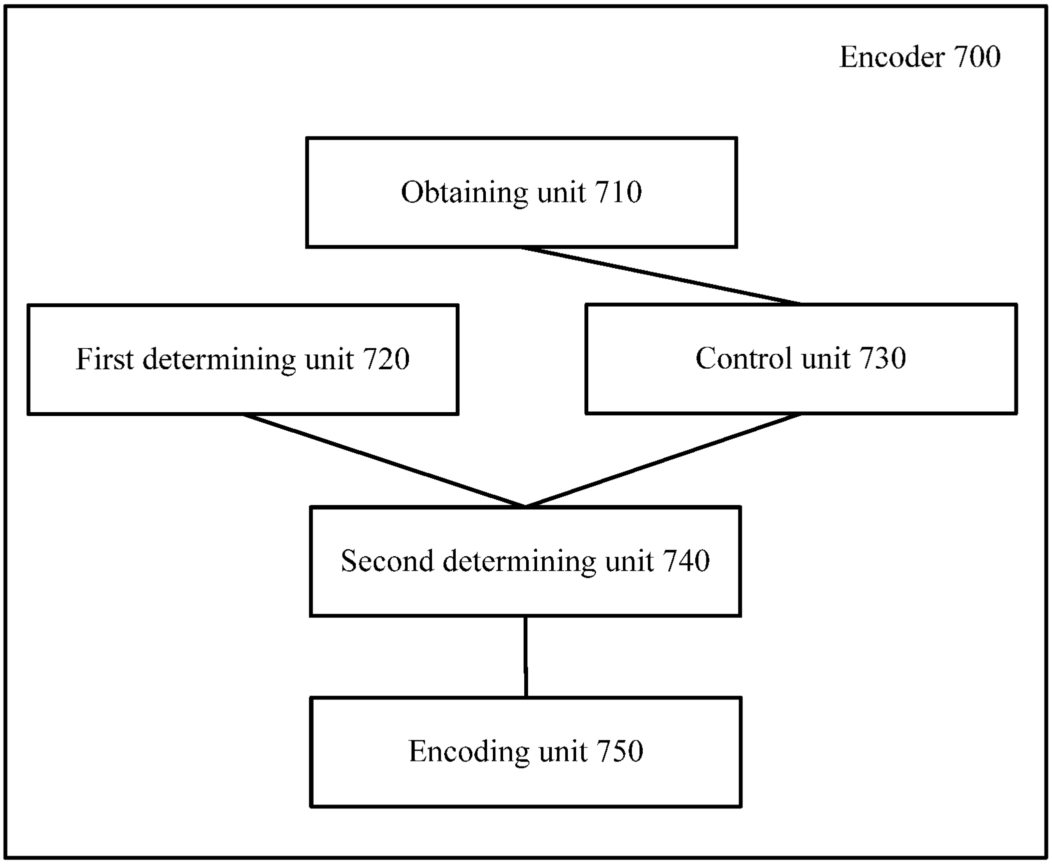
FIG. 7 is a schematic structural diagram of an encoder according to an embodiment of this application.

FIG. 7 is a schematic block diagram of an encoder according to an embodiment of this application. The encoder 700 in FIG. 7 includes an obtaining unit 710 configured to obtain a multi-channel signal of a current frame, a first determining unit 720 configured to determine an initial ITD value of the current frame, a control unit 730 configured to control, based on characteristic information of the multi-channel signal, a quantity of target frames that are allowed to appear continuously, where the characteristic information includes at least one of a signal-to-noise ratio parameter of the multi-channel signal and a peak feature of cross correlation coefficients of the multi-channel signal, and an ITD value of a previous frame of the target frame is reused as an ITD value of the target frame, a second determining unit 740 configured to determine an ITD value of the current frame based on the initial ITD value of the current frame and the quantity of target frames that are allowed to appear continuously, and an encoding unit 750 configured to encode the multi-channel signal based on the ITD value of the current frame.

According to this embodiment of this application, impact of environmental factors, such as background noise, reverberation, and multi-party speech, on accuracy and stability of a calculation result of an ITD value can be reduced, and when there is background noise, reverberation, or multi-party speech, or a signal harmonic characteristic is unapparent, stability of an ITD value in PS encoding is improved, and unnecessary transitions of the ITD value are reduced to the greatest extent, thereby avoiding inter-frame discontinuity of a downmixed signal and instability of an acoustic image of a decoded signal. In addition, according to this embodiment of this application, phase information of a stereo signal can be better retained, and acoustic quality is improved.

Optionally, in some embodiments, the encoder 700 further includes a third determining unit (not shown) configured to determine the peak feature of the cross correlation coefficients of the multi-channel signal based on amplitude of a peak value of the cross correlation coefficients of the multi-channel signal and an index of a peak position of the cross correlation coefficients of the multi-channel signal.

Optionally, in some embodiments, the third determining unit is further configured to determine a peak amplitude confidence parameter based on the amplitude of the peak value of the cross correlation coefficients of the multi-channel signal, where the peak amplitude confidence parameter represents a confidence level of the amplitude of the peak value of the cross correlation coefficients of the multi-channel signal, determine a peak position fluctuation parameter based on an ITD value corresponding to the index of the peak position of the cross correlation coefficients of the multi-channel signal, and an ITD value of a previous frame of the current frame, where the peak position fluctuation parameter represents a difference between the ITD value corresponding to the index of the peak position of the cross correlation coefficients of the multi-channel signal and the ITD value of the previous frame of the current frame, and determine the peak feature of the cross correlation coefficients of the multi-channel signal based on the peak amplitude confidence parameter and the peak position fluctuation parameter.

Optionally, in some embodiments, the third determining unit is further configured to determine, as the peak amplitude confidence parameter, a ratio of a difference between an amplitude value of the peak value of the cross correlation coefficients of the multi-channel signal and an amplitude value of a second largest value of the cross correlation coefficients of the multi-channel signal to the amplitude value of the peak value.

Optionally, in some embodiments, the third determining unit is further configured to determine, as the peak position fluctuation parameter, an absolute value of a difference between the ITD value corresponding to the index of the peak position of the cross correlation coefficients of the multi-channel signal and the ITD value of the previous frame of the current frame.

Optionally, in some embodiments, the control unit 730 is further configured to control, based on the peak feature of the cross correlation coefficients of the multi-channel signal, the quantity of target frames that are allowed to appear continuously, and when the peak feature of the cross correlation coefficients of the multi-channel signal meets a preset condition, reduce, by adjusting at least one of a target frame count and a threshold of the target frame count, the quantity of target frames that are allowed to appear continuously, where the target frame count is used to represent a quantity of target frames that have currently appeared continuously, and the threshold of the target frame count is used to indicate the quantity of target frames that are allowed to appear continuously.

Optionally, in some embodiments, the control unit 730 is further configured to reduce, by increasing the target frame count, the quantity of target frames that are allowed to appear continuously.

Optionally, in some embodiments, the control unit 730 is further configured to reduce, by decreasing the threshold of the target frame count, the quantity of target frames that are allowed to appear continuously.

Optionally, in some embodiments, the control unit 730 is further configured to, when the signal-to-noise ratio parameter of the multi-channel signal does not meet a preset signal-to-noise ratio condition, control, based on the peak feature of the cross correlation coefficients of the multi-channel signal, the quantity of target frames that are allowed to appear continuously, and the encoder 700 further includes a stop unit (not shown) configured to, when a signal-to-noise ratio of the multi-channel signal meets the signal-to-noise ratio condition, stop reusing the ITD value of the previous frame of the current frame as the ITD value of the current frame.

Optionally, in some embodiments, the control unit 730 is further configured to determine whether the signal-to-noise ratio parameter of the multi-channel signal meets a preset signal-to-noise ratio condition, and when the signal-to-noise ratio parameter of the multi-channel signal does not meet the signal-to-noise ratio condition, control, based on the peak feature of the cross correlation coefficients of the multi-channel signal, the quantity of target frames that are allowed to appear continuously, or when a signal-to-noise ratio of the multi-channel signal meets the signal-to-noise ratio condition, stop reusing the ITD value of the previous frame of the current frame as the ITD value of the current frame.

Optionally, in some embodiments, the stop unit is configured to increase the target frame count such that a value of the target frame count is greater than or equal to the threshold of the target frame count, where the target frame count is used to represent the quantity of target frames that have currently appeared continuously, and the threshold of the target frame count is used to indicate the quantity of target frames that are allowed to appear continuously.

Optionally, in some embodiments, the second determining unit 740 is further configured to determine the ITD value of the current frame based on the initial ITD value of the current frame, the target frame count, and the threshold of the target frame count, where the target frame count is used to represent the quantity of target frames that have currently appeared continuously, and the threshold of the target frame count is used to indicate the quantity of target frames that are allowed to appear continuously.

Optionally, in some embodiments, the signal-to-noise ratio parameter is a modified segmental signal-to-noise ratio of the multi-channel signal.

Figure 8:
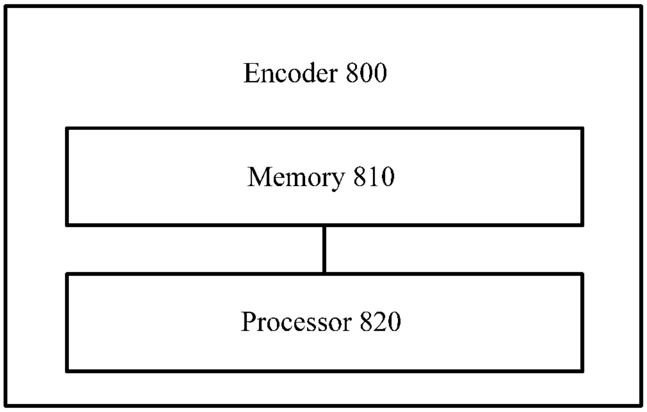
FIG. 8 is a schematic structural diagram of an encoder according to an embodiment of this application.

FIG. 8 is a schematic block diagram of an encoder 800 according to an embodiment of this application. The encoder 800 in FIG. 8 includes a memory 810 configured to store a program, and a processor 820 configured to execute the program, where when the program is executed, the processor 820 is configured to obtain a multi-channel signal of a current frame, determine an initial ITD value of the current frame, control, based on characteristic information of the multi-channel signal, a quantity of target frames that are allowed to appear continuously, where the characteristic information includes at least one of a signal-to-noise ratio parameter of the multi-channel signal and a peak feature of cross correlation coefficients of the multi-channel signal, and an ITD value of a previous frame of the target frame is reused as an ITD value of the target frame, determine an ITD value of the current frame based on the initial ITD value of the current frame and the quantity of target frames that are allowed to appear continuously, and encode the multi-channel signal based on the ITD value of the current frame.

According to this embodiment of this application, impact of environmental factors, such as background noise, reverberation, and multi-party speech, on accuracy and stability of a calculation result of an ITD value can be reduced, and when there is background noise, reverberation, or multi-party speech, or a signal harmonic characteristic is unapparent, stability of an ITD value in PS encoding is improved, and unnecessary transitions of the ITD value are reduced to the greatest extent, thereby avoiding inter-frame discontinuity of a downmixed signal and instability of an acoustic image of a decoded signal. In addition, according to this embodiment of this application, phase information of a stereo signal can be better retained, and acoustic quality is improved.

Optionally, in some embodiments, the encoder 800 is further configured to determine the peak feature of the cross correlation coefficients of the multi-channel signal based on amplitude of a peak value of the cross correlation coefficients of the multi-channel signal and an index of a peak position of the cross correlation coefficients of the multi-channel signal.

Optionally, in some embodiments, the encoder 800 is further configured to determine a peak amplitude confidence parameter based on the amplitude of the peak value of the cross correlation coefficients of the multi-channel signal, where the peak amplitude confidence parameter represents a confidence level of the amplitude of the peak value of the cross correlation coefficients of the multi-channel signal, determine a peak position fluctuation parameter based on an ITD value corresponding to the index of the peak position of the cross correlation coefficients of the multi-channel signal, and an ITD value of a previous frame of the current frame, where the peak position fluctuation parameter represents a difference between the ITD value corresponding to the index of the peak position of the cross correlation coefficients of the multi-channel signal and the ITD value of the previous frame of the current frame, and determine the peak feature of the cross correlation coefficients of the multi-channel signal based on the peak amplitude confidence parameter and the peak position fluctuation parameter.

Optionally, in some embodiments, the encoder 800 is further configured to determine, as the peak amplitude confidence parameter, a ratio of a difference between an amplitude value of the peak value of the cross correlation coefficients of the multi-channel signal and an amplitude value of a second largest value of the cross correlation coefficients of the multi-channel signal to the amplitude value of the peak value.

Optionally, in some embodiments, the encoder 800 is further configured to determine, as the peak position fluctuation parameter, an absolute value of a difference between the ITD value corresponding to the index of the peak position of the cross correlation coefficients of the multi-channel signal and the ITD value of the previous frame of the current frame.

Optionally, in some embodiments, the encoder 800 is further configured to control, based on the peak feature of the cross correlation coefficients of the multi-channel signal, the quantity of target frames that are allowed to appear continuously, and when the peak feature of the cross correlation coefficients of the multi-channel signal meets a preset condition, reduce, by adjusting at least one of a target frame count and a threshold of the target frame count, the quantity of target frames that are allowed to appear continuously, where the target frame count is used to represent a quantity of target frames that have currently appeared continuously, and the threshold of the target frame count is used to indicate the quantity of target frames that are allowed to appear continuously.

Optionally, in some embodiments, the encoder 800 is further configured to reduce, by increasing the target frame count, the quantity of target frames that are allowed to appear continuously.

Optionally, in some embodiments, the encoder 800 is further configured to reduce, by decreasing the threshold of the target frame count, the quantity of target frames that are allowed to appear continuously.

Optionally, in some embodiments, the encoder 800 is further configured to only when the signal-to-noise ratio parameter of the multi-channel signal does not meet a preset signal-to-noise ratio condition, control, based on the characteristic information of the multi-channel signal, the quantity of target frames that are allowed to appear continuously, and the encoder 800 is further configured to when a signal-to-noise ratio of the multi-channel signal meets the signal-to-noise ratio condition, stop reusing the ITD value of the previous frame of the current frame as the ITD value of the current frame.

Optionally, in some embodiments, the encoder 800 is further configured to determine whether the signal-to-noise ratio parameter of the multi-channel signal meets a preset signal-to-noise ratio condition, and when the signal-to-noise ratio parameter of the multi-channel signal does not meet the signal-to-noise ratio condition, control, based on the peak feature of the cross correlation coefficients of the multi-channel signal, the quantity of target frames that are allowed to appear continuously, or when a signal-to-noise ratio of the multi-channel signal meets the signal-to-noise ratio condition, stop reusing the ITD value of the previous frame of the current frame as the ITD value of the current frame.

Optionally, in some embodiments, the encoder 800 is further configured to increase the target frame count such that a value of the target frame count is greater than or equal to the threshold of the target frame count, where the target frame count is used to represent the quantity of target frames that have currently appeared continuously, and the threshold of the target frame count is used to indicate the quantity of target frames that are allowed to appear continuously.

Optionally, in some embodiments, the encoder 800 is further configured to determine the ITD value of the current frame based on the initial ITD value of the current frame, the target frame count, and the threshold of the target frame count, where the target frame count is used to represent the quantity of target frames that have currently appeared continuously, and the threshold of the target frame count is used to indicate the quantity of target frames that are allowed to appear continuously.

Optionally, in some embodiments, the signal-to-noise ratio parameter is a modified segmental signal-to-noise ratio of the multi-channel signal.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a universal serial bus (USB) flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for encoding an audio signal, the method comprising:

- obtaining a multi-channel signal of a current frame, wherein the multi-channel signal includes a first-channel signal and a second-channel signal;
- obtaining a characteristic parameter of the current frame, wherein the characteristic parameter comprises at least one of a signal-to-noise ratio of the current frame or a peak feature of cross-correlation coefficients of the current frame;
- determining, based on the characteristic parameter, whether to use a previous inter-channel time difference (ITD) value of a previous frame as a current ITD value of the current frame;
- encoding, in response to determining to use the previous ITD value as the current ITD value, the current frame based on the previous ITD value to obtain a bitstream; and
- storing or transmitting the bitstream.

2. The method of claim 1, further comprising obtaining the peak feature based on an amplitude of a peak value of the cross-correlation coefficients and an index of a peak position of the cross-correlation coefficients.

3. The method of claim 2, wherein obtaining the peak feature comprises:

- obtaining a peak amplitude confidence parameter based on the amplitude, wherein the peak amplitude confidence parameter represents a confidence level of the amplitude;
- determining a peak position fluctuation parameter based on an index ITD value corresponding to the index and the previous ITD value, wherein the peak position fluctuation parameter represents a first difference between the index ITD value and the previous ITD value; and
- determining the peak feature based on the peak amplitude confidence parameter and the peak position fluctuation parameter.

4. The method of claim 3, wherein determining the peak amplitude confidence parameter comprises determining, as the peak amplitude confidence parameter, a ratio of a second difference to a first amplitude value of the peak value, and wherein the second difference is between the first amplitude value and a second amplitude value of a second-largest value of the cross-correlation coefficients.

5. The method of claim 3, wherein determining the peak position fluctuation parameter comprises determining, as the peak position fluctuation parameter, an absolute value of the first difference.

6. The method of claim 1, wherein determining, based on the characteristic parameter, whether to use the previous ITD value as the current ITD value comprises:

- incrementing a frame count by one to obtain a current frame count value, wherein the frame count counts a quantity of continuous target frames, wherein a target frame is a frame that uses an ITD value of a previous frame of the target frame as an ITD value of the target frame;
- comparing the current frame count value with a maximum quantity of the continuous target frames; and determining, in response to the current frame count value not being greater than the maximum quantity, to use the previous ITD value as the current ITD value.

7. The method of claim 6, further comprising:

determining whether the signal-to-noise ratio satisfies a preset signal-to-noise ratio condition; and determining, in response to the current frame count value not being greater than the maximum quantity and the signal-to-noise ratio satisfying the preset signal-to-noise ratio condition, to use the previous ITD value as the current ITD value.

8. An encoder, comprising:

a memory configured to store programming instructions; and a processor coupled to the memory and configured to execute the programming instructions to cause the encoder to:

obtain a multi-channel signal of a current frame, wherein the multi-channel signal includes a first-channel signal and a second-channel signal;

obtain a characteristic parameter of the current frame, wherein the characteristic parameter comprises at least one of a signal-to-noise ratio of the current frame or a peak feature of cross-correlation coefficients of the current frame;

determine, based on the characteristic parameter, whether to use a previous inter-channel time difference (ITD) value of a previous frame of the current frame as a current ITD value of the current frame;

encode, in response to determining to use the previous ITD value as the current ITD value, the current frame based on the previous ITD value to obtain a bitstream; and store or transmit the bitstream.

9. The encoder of claim 8, wherein the processor is configured to execute the programming instructions to further cause the encoder to obtain the peak feature based on an amplitude of a peak value of the cross-correlation coefficients and an index of a peak position of the cross-correlation coefficients.

10. The encoder of claim 9, wherein the processor is configured to execute the programming instructions to further cause the encoder to:

obtain a peak amplitude confidence parameter based on the amplitude, wherein the peak amplitude confidence parameter represents a confidence level of the amplitude;

determine a peak position fluctuation parameter based on an index ITD value corresponding to the index and the previous ITD value, wherein the peak position fluctuation parameter represents a first difference between the index ITD value and the previous ITD value; and determine the peak feature based on the peak amplitude confidence parameter and the peak position fluctuation parameter.

11. The encoder of claim 10, wherein the processor is configured to execute the programming instructions to further cause the encoder to determine, as the peak amplitude confidence parameter, a ratio of a second difference to a first amplitude value of the peak value, and wherein the second difference is between the first amplitude value and a second amplitude value of a second-largest value of the cross-correlation coefficients.

12. The encoder of claim 10, wherein the processor is configured to execute the programming instructions to further cause the encoder to determine, as the peak position fluctuation parameter, an absolute value of the first difference.

13. The encoder of claim 8, wherein the processor is configured to execute the programming instructions to further cause the encoder to:

increment a frame count by one to obtain a current frame count value, wherein the frame count counts a quantity of continuous target frames, wherein a target frame is a frame that uses an ITD value of a previous frame of the target frame as an ITD value of the target frame;

compare the current frame count value with a maximum quantity of the continuous target frames; and determine, in response to the current frame count value not being greater than the maximum quantity, to use the previous ITD value as the current ITD value.

14. The encoder of claim 13, wherein the processor is configured to execute the programming instructions to further cause the encoder to:

determine whether the signal-to-noise ratio satisfies a preset signal-to-noise ratio condition; and determine, in response to the current frame count value not being greater than the maximum quantity and the signal-to-noise ratio satisfies the preset signal-to-noise ratio condition, to use the previous ITD value as the current ITD value.

15. A non-transitory computer-readable storage medium storing computer instructions, that when executed by a processor, cause an encoder to:

obtain a multi-channel signal of a current frame, wherein the multi-channel signal includes a first-channel signal and a second-channel signal;

obtain a characteristic parameter of the current frame, wherein the characteristic parameter comprises at least one of a signal-to-noise ratio of the current frame or a peak feature of cross-correlation coefficients of the current frame;

determine, based on the characteristic parameter, whether to use a previous inter-channel time difference (ITD) value of a previous frame as a current ITD value of the current frame;

encode, in response to determining to use the previous ITD value as the current ITD value, the current frame based on the previous ITD value to obtain a bitstream; and store or transmit the bitstream.

16. The non-transitory computer-readable storage medium of claim 15, wherein the computer instructions, when executed by the processor, further cause the encoder to obtain the peak feature based on an amplitude of a peak value of the cross-correlation coefficients and an index of a peak position of the cross-correlation coefficients.

17. The non-transitory computer-readable storage medium of claim 16, wherein the computer instructions, when executed by the processor, further cause the encoder to:

obtain a peak amplitude confidence parameter based on the amplitude, wherein the peak amplitude confidence parameter represents a confidence level of the amplitude;

determine a peak position fluctuation parameter based on an index ITD value corresponding to the index and the previous ITD value, wherein the peak position fluctuation parameter represents a first difference between the index ITD value and the previous ITD value; and determine the peak feature based on the peak amplitude confidence parameter and the peak position fluctuation parameter.

18. The non-transitory computer-readable storage medium of claim 17, wherein the computer instructions, when executed by the processor, further cause the encoder to determine, as the peak amplitude confidence parameter, a ratio of a second difference to a first amplitude value of the peak value, and wherein the second difference is between the first amplitude value and a second amplitude value of a second-largest value of the cross-correlation coefficients.

19. The non-transitory computer-readable storage medium of claim 17, wherein the computer instructions, when executed by the processor, further cause the encoder to determine, as the peak position fluctuation parameter, an absolute value of the first difference.

20. The non-transitory computer-readable storage medium of claim 15, wherein the computer instructions, when executed by the processor, further cause the encoder to:

increment a frame count by one to obtain a current frame count value, wherein the frame count counts a quantity of continuous target frames, wherein a target frame is a frame that uses an ITD value of a previous frame of the target frame as an ITD value of the target frame;

compare the current frame count value with a maximum quantity of the continuous target frames; and determine, in response to the current frame count value not being greater than the maximum quantity, to use the previous ITD value as the current ITD value.

* * * * *